(12) United States Patent
Maeda et al.

(10) Patent No.: US 9,567,026 B2
(45) Date of Patent: Feb. 14, 2017

(54) LOCKING STRUCTURE FOR SADDLE TYPE VEHICLE

(71) Applicant: HONDA MOTOR CO., LTD., Tokyo (JP)

(72) Inventors: Rui Maeda, Wako (JP); Masaomi Yamada, Wako (JP); Shun Niijima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 213 days.

(21) Appl. No.: 14/589,556

(22) Filed: Jan. 5, 2015

(65) Prior Publication Data
US 2015/0197297 A1 Jul. 16, 2015

(30) Foreign Application Priority Data

Jan. 10, 2014 (JP) .................................. 2014-003650

(51) Int. Cl.
*B62H 5/00* (2006.01)
*B62K 19/46* (2006.01)

(52) U.S. Cl.
CPC .............. *B62H 5/001* (2013.01); *B62H 5/00* (2013.01); *B62H 5/006* (2013.01); *B62K 19/46* (2013.01); *Y10T 70/554* (2015.04)

(58) Field of Classification Search
CPC .......... B62K 19/46; B62K 19/48; B62J 17/02; B62J 17/00; B62H 5/00
See application file for complete search history.

(56) References Cited

U.S. PATENT DOCUMENTS

| | | | |
|---|---|---|---|
| 9,248,879 B2* | 2/2016 | Nishida | B62J 35/00 |
| 2015/0029738 A1* | 1/2015 | Takenaka | B62J 6/02 |
| | | | 362/474 |
| 2015/0203071 A1* | 7/2015 | Kinoshita | B60R 25/04 |
| | | | 180/287 |
| 2015/0377281 A1* | 12/2015 | Nagaoka | B62J 1/12 |
| | | | 297/188.09 |
| 2016/0214677 A1* | 7/2016 | Mizuta | B62K 19/30 |

FOREIGN PATENT DOCUMENTS

JP 2013-043461 A 3/2013

* cited by examiner

*Primary Examiner* — Kevin Hurley
(74) *Attorney, Agent, or Firm* — Birch, Stewart, Kolasch & Birch, LLP

(57) ABSTRACT

A locking structure for a saddle type vehicle to prevent theft and achieve a tamper-proofing effect while securing a storage space in a vehicle body. A front cover is provided with a storage part which is openably closed with a lid. The lid is lockable into a closed state or unlockable from the closed state by means of a lid lock mechanism. A main seat is lockable into an engaged state with seat rails or unlockable from the engaged state by means of a seat lock mechanism. At least one of the lid lock mechanism and the seat lock mechanism is connected to a key cylinder by a first cable and a second cable. The key cylinder overlaps a steering shaft in a side view, and is located within an opening provided in an inner cover, which is a component of the front cover, in a top plan view.

20 Claims, 21 Drawing Sheets

LOCKING STRUCTURE FOR SADDLE TYPE VEHICLE

CROSS-REFERENCE TO RELATED APPLICATIONS

The present application claims priority under 35 USC 119 to Japanese Patent Application No. 2014-003650 filed Jan. 10, 2014 the entire contents of which are hereby incorporated by reference.

BACKGROUND OF THE INVENTION

1. Field of the Invention

The present invention relates to a locking structure for a saddle type vehicle in which a storage part at a front portion of a vehicle body and a seat are each provided with a locking mechanism.

2. Description of Background Art

Heretofore, there has been known a vehicle in which a key cylinder for locking a seat to prevent a seat from being detached from a vehicle body is attached to a body frame. See, for example, Japanese Patent Laid-Open No. 2013-43461.

In recent years, mounting of in-vehicle electric equipment such as ETC has come to be demanded also on motorcycles. It is desired to secure a storage space in other vehicle body areas rather than the area beneath a seat. In addition, it is desirable that a key cylinder or the like constituting a locking mechanism be disposed on the basis of each storage space for antitheft purposes. Such an approach, however, involves an additional cost, and it is difficult to secure space for disposing the key cylinders and the like in the vehicle body of a motorcycle. Furthermore, it is requested to enhance a preventive effect on tampering with the above-mentioned locking mechanism.

SUMMARY AND OBJECTS OF THE INVENTION

The present invention has been made in consideration of the above-mentioned circumstances. Accordingly, it is an object of an embodiment of the present invention to provide a locking structure for a saddle type vehicle that makes it possible to realize an antitheft measure while securing storage space in a vehicle body and, further, to enhance a tamper-proofing effect.

In order to solve the aforementioned problem, according to an embodiment of the present invention a locking structure for a saddle type vehicle includes a body frame (F) with a head pipe (12), main frames (13L, 13R) provided rearwardly of the head pipe (12), and seat rails (15L, 15R) connected to rear ends of the main frames (13L, 13R). A eat (45) is detachably supported on the seat rails (15L, 15R). The structure includes a front cover (47) covering the head pipe (12) from a front side. The front cover (47) includes a front outer cover (56a) having a face oriented outwardly in a vehicle width direction, and a front inner cover (56b) having a face oriented inwardly in the vehicle width direction. The front outer cover (56a) and the front inner cover (56b) are provided as one body (monolithically) or as separate bodies. The front cover (47) is provided with a storage part (401L, 401R) openably closed with a lid (403L, 403R), the lid (403L, 403R) being lockable into a closed state or unlockable from the closed state by a lid lock mechanism (406L, 406R). The seat (45) is a main seat on which a driver is seated. The seat (45) is lockable into an engaged state with the seat rails (15L, 15R) or unlockable from the engaged state by a seat lock mechanism (437). At least one of the lid lock mechanism (406L, 406R) and the seat lock mechanism (437) is connected to a key cylinder (407) by a cable (435, 436). The key cylinder (407) overlaps a steering shaft (425) in side view and is located within an opening (56f), which is provided in the front inner cover (56b), in top plan view.

In the above-mentioned configuration, the main frames (13L, 13R) are provided in a left-right pair, a fuel tank (41) may be disposed between the left and right main frames (13L, 13R), the lid lock mechanism (406L, 406R) may be disposed forwardly of the fuel tank (41), and the seat lock mechanism (437) may be disposed rearwardly of the fuel tank (41). The key cylinder (407) may be disposed between the lid lock mechanism (406L) and the seat lock mechanism (437) in a side view, and may be supported, at a position with an offset in the vehicle width direction from a vehicle body center, by a front sub-frame (433) extending forward from a front portion of the body frame (F) to support the front cover (47).

In addition, in the above-mentioned configuration, the front outer cover (56a) and the front inner cover (56b) may be provided as separate bodies. The front inner cover (56b) may have a first inclined surface (56g) inclined toward an inner side in the vehicle width direction and a substantially vertical second inclined surface (56h) steeper in inclination than the first inclined surface (56g). The opening (56f) may be provided in the first inclined surface (56g). A lateral side of the key cylinder (407) may be covered with the second inclined surface (56h).

In the above-mentioned configuration, the front sub-frame (433) may include a key cylinder holding part (438) holding the key cylinder (407). The key cylinder holding part (438) may include a front covering portion (438b) and a rear covering portion (438c) which respectively cover a front side and a rear side of the key cylinder (407). The cables (435, 436) connected respectively to the lid lock mechanism (406L) and the seat lock mechanism (437) may be supported by the rear covering portion (438c).

In the above-mentioned configuration, a decorative laminate (431) may be provided between the key cylinder holding part (438) and the front cover (47). The decorative laminate (431) may be provided with an opening (431a) through which a key hole (407a) of the key cylinder (407) is exposed. The decorative laminate (431) may be fastened to two portions, consisting of an upper portion and a side portion, of the key cylinder holding part (438).

Further, in the above-mentioned configuration, the decorative laminate (431) may be visible through the opening (56f) of the front cover (47) in plan view. The decorative laminate (431) may be provided, as one body, with guide portions (431j, 431f) for guiding the cables (435, 436) and an inside covering portion (431b) for covering an inner side in the vehicle width direction.

Thus, as aforementioned, according to an embodiment of the present invention, there is provided a structure in which the front cover covering the head pipe from the front side is provided. The front cover includes the front outer cover having a face oriented outwardly in the vehicle width direction. The front inner cover includes a face oriented inwardly in the vehicle width direction with the front outer cover and the front inner cover being provided as one body or as separate bodies. The front cover is provided with the storage part openably closed with the lid. The lid is lockable into a closed state or unlockable from the closed state by the lid lock mechanism. The seat is the main seat on which to seat a driver and is lockable into an engaged state with the seat rails or unlockable from the engaged state by the seat lock mechanism. At least one of the lid lock mechanism and the seat lock mechanism is connected to the key cylinder by cables and the key cylinder overlaps the steering shaft in side view, and is located within the opening, which is formed in the front inner cover, in top plan view. With the storage part provided inside the front cover, therefore, storage space can be secured in the vehicle body.

Since a side surface of the key cylinder connected to at least one of the lid lock mechanism and the seat lock mechanism is covered with the steering shaft and the key cylinder is situated inside the front inner cover, a preventive effect on tampering with the key cylinder can be enhanced. Further, since the single key cylinder is provided for the plurality of lock mechanisms, the space taken up by the vehicle body can be reduced without raising the cost, and the key cylinder can be easily disposed even in a small vehicle body space of a motorcycle.

As aforementioned, a configuration may be adopted in which the main frames are provided in a left-right pair, with the fuel tank being disposed between the left and right main frames, the lid lock mechanism being disposed forwardly of the fuel tank, and the seat lock mechanism being disposed rearwardly of the fuel tank. The key cylinder is located between the lid lock mechanism and the seat lock mechanism in a side view, and is supported by the front sub-frame, which extends forward from a front portion of the body frame to support the front cover, at a position with an offset along the vehicle width direction from the vehicle body center. Since the key cylinder designed to specialize in locking of the seat and the storage part is disposed between the lid lock mechanism and the seat lock mechanism, the cables for connection of them can be minimized in length. Further, since the attachment part for the key cylinder is provided on the front sub-frame located at a front portion of the vehicle body, the processing required in this instance can be facilitated as compared with the case of processing the body frame. Thus, enhanced productivity is achieved.

A configuration may be adopted in which the front outer cover and the front inner cover are provided as separate bodies. The front inner cover includes the first inclined surface inclined toward the inner side in the vehicle width direction and the substantially vertical second inclined surface steeper in inclination than the first inclined surface. The opening is provided in the first inclined surface with a lateral side of the key cylinder being covered by the second inclined surface. In this case, with the opening provided in the first inclined surface, this structure makes the opening and the key hole invisible sideways. Furthermore, with the key cylinder covered from a lateral side by the second inclined surface, tampering with the key cylinder can be prevented more assuredly. Further, with the front outer cover and the front inner cover provided as separate bodies, it is easy to provide the opening and the like, whereby enhanced productivity can be attained.

A configuration may be adopted in which the front sub-frame includes the key cylinder holding part holding the key cylinder. The key cylinder holding part includes the front covering portion covering the front side of the key cylinder and the rear covering portion covering the rear side of the key cylinder. The cables, connected respectively to the lid lock mechanism and the seat lock mechanism, are supported by the rear covering portion. With the front side and the rear side of the key cylinder being covered by the key cylinder holding part, tampering can be prevented more reliably. Further, with the cables held by the rear covering portion, the number of component parts can be reduced as compared with the case where a cable holding part is provided specially.

In addition, a configuration may be adopted in which the decorative laminate is provided between the key cylinder holding part and the front cover. The decorative laminate is provided with the opening through which the key hole of the key cylinder is exposed with the decorative laminate being connected to two portions, consisting of an upper portion and a side portion, of the key cylinder holding part. This configuration enables highly accurate positioning of the key cylinder and the decorative laminate, whereby the key hole can be put into register with the opening of the decorative laminate highly accurately, leading to enhanced external appearance and enhanced quality.

Further, a configuration may be adopted in which the decorative laminate is visible through the opening of the front cover in a plan view. The decorative laminate is provided, as one body, with the guide portions for guiding the cables and the inside covering portion for covering the inner side in the vehicle width direction. Positional matching between the center of the opening of the front cover and the center of the key hole of the key cylinder is difficult to achieve in a vehicle in which a plurality of covers are assembled together. According to an embodiment of the present invention, on the other hand, with the decorative laminate being positionally matched to the key cylinder and with the large opening of the front cover thereon being made visible together with the decorative laminate, positional scattering of the opening of the front cover and the decorative laminate can made inconspicuous. Thus, an enhanced external appearance can be ensured. Further, with the decorative laminate being provided with the guide portions and the inside covering portion as one body, the number of component parts can be reduced while guiding and protecting the cables.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 20(A) and 20(B) illustrate the lid lock mechanism, wherein FIG. 20(A) is a sectional view of the lid lock mechanism as viewed from the front side, and FIG. 20(B) is a sectional view of the lid lock mechanism as viewed from above; and FIGS. 21(A), 21(B) and 21(C) show an operational view illustrating an operation of the lid lock mechanism, wherein FIG. 21(A) is an operational view showing a state in which an unlocking inhibition mechanism is actuated, FIG. 21(B) is an operational view showing a state in which a lid operator is operated, and FIG. 21(C) is an operational view showing an operation of a lock mechanism.

DETAILED DESCRIPTION OF THE PREFERRED EMBODIMENTS

Figure 1:
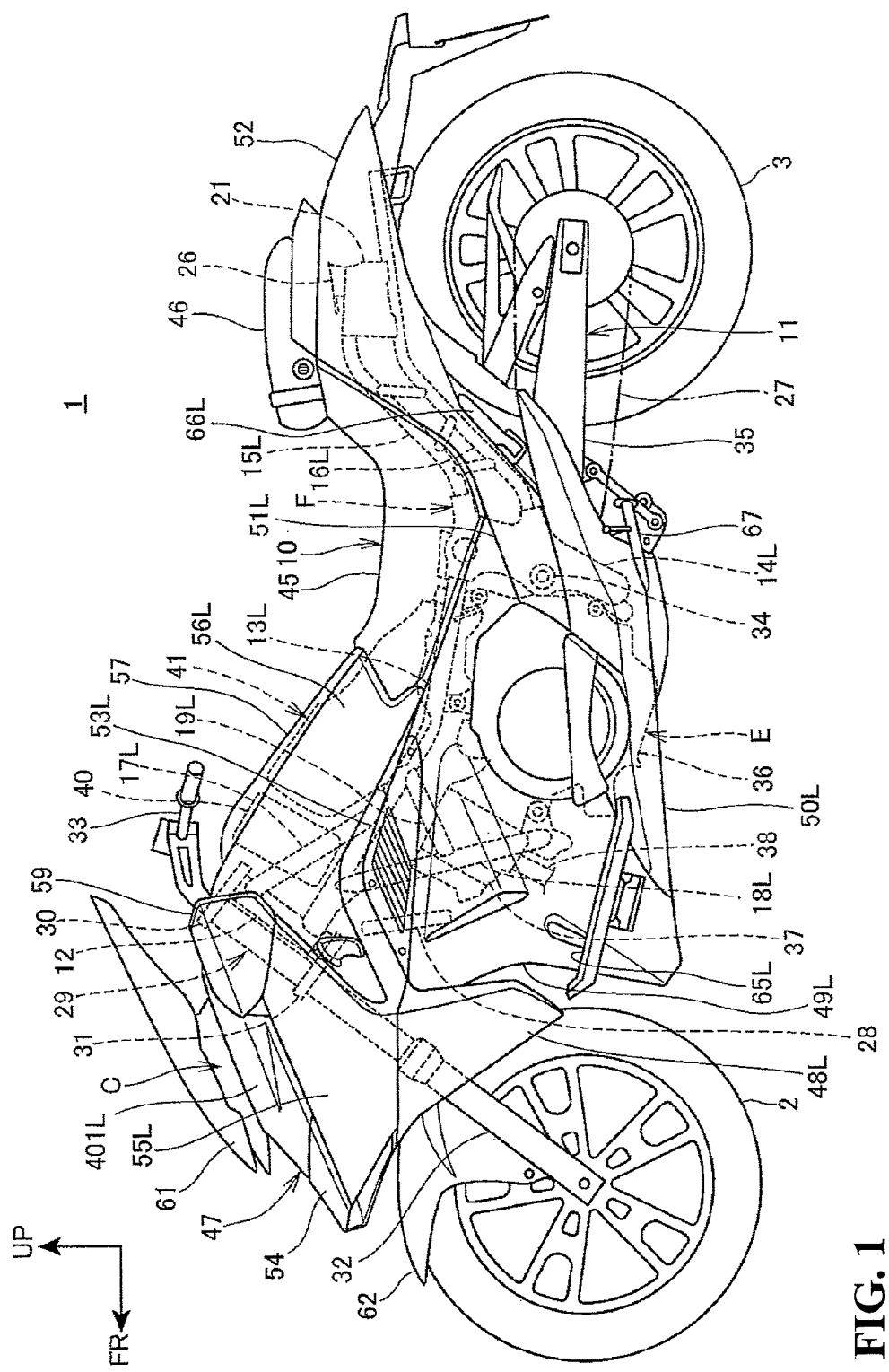
FIG. 1 is a left side view of a motorcycle provided with a locking structure according to the present invention.

Hereafter, an embodiment of the present invention will be described referring to the drawings. Note that forward, rearward, leftward, rightward, upward, and downward directions in the description are the directions with reference to a vehicle body unless otherwise specified. In addition, symbol FR in the drawings indicates the front side of the vehicle body, symbol UP indicates the upper side of the vehicle body, and symbol LE indicates the left side of the vehicle body.

Figure 2:
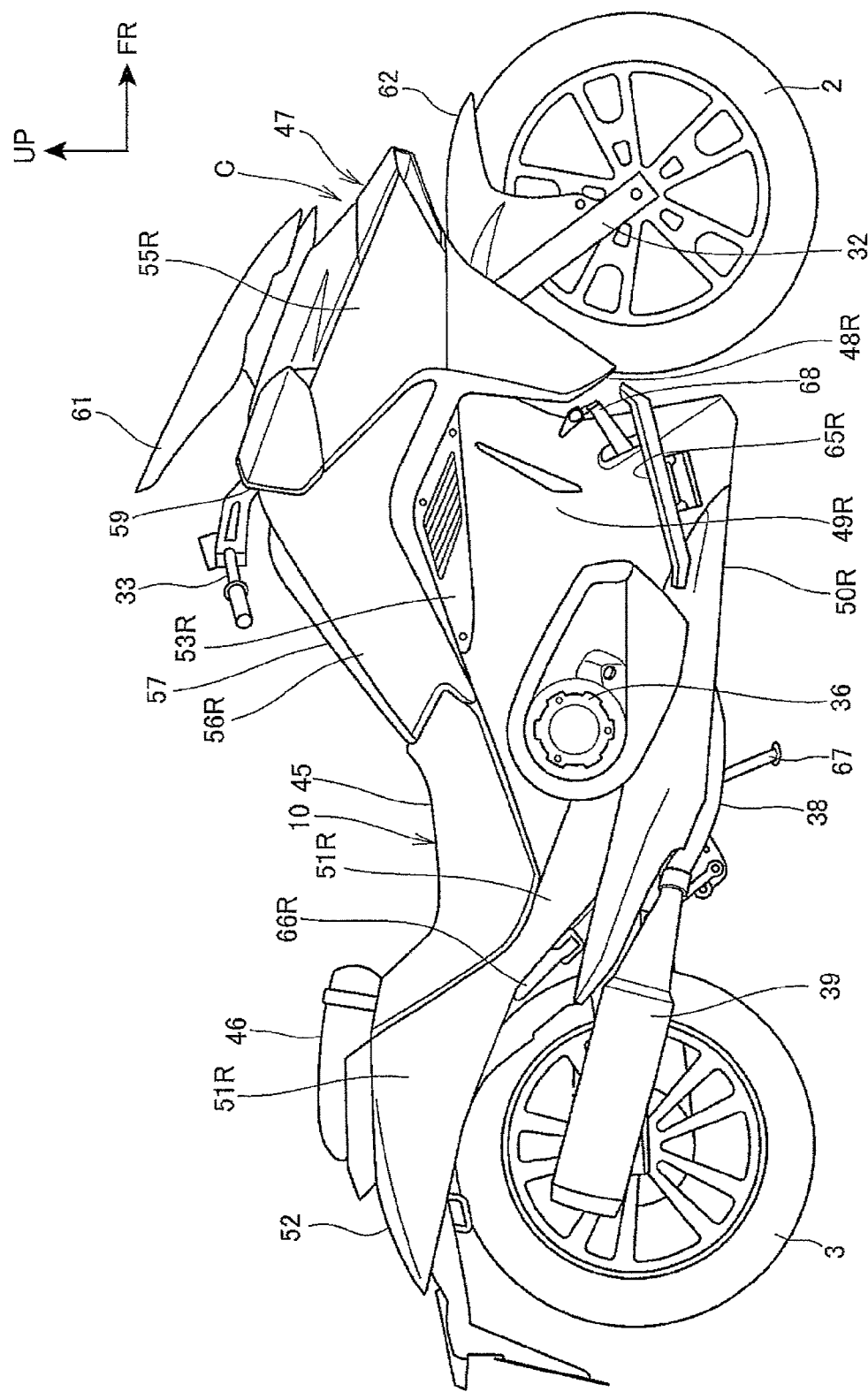
FIG. 2 is a right side view of the motorcycle.
Figure 3:
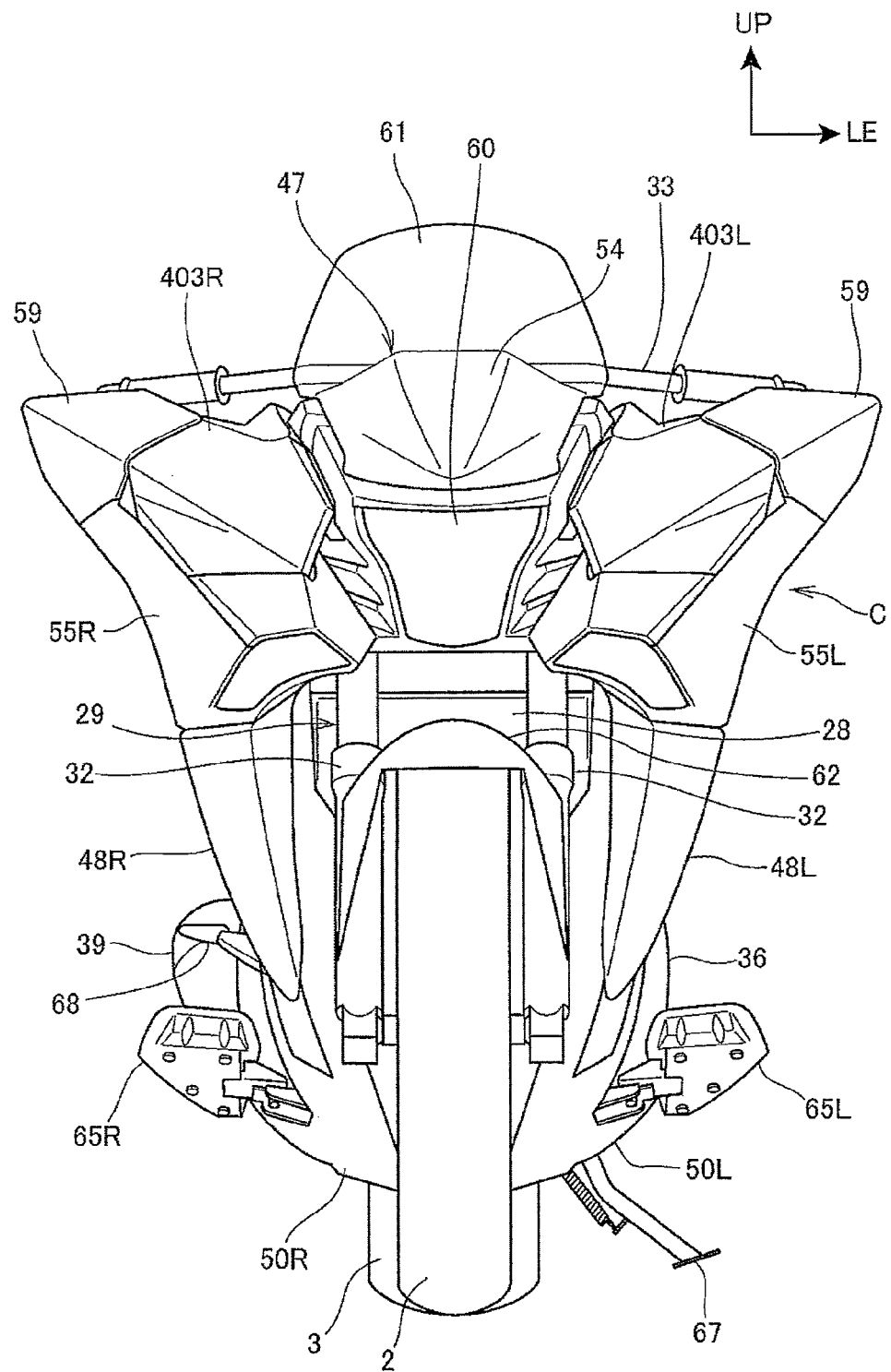
FIG. 3 is a front view of the motorcycle.
Figure 4:
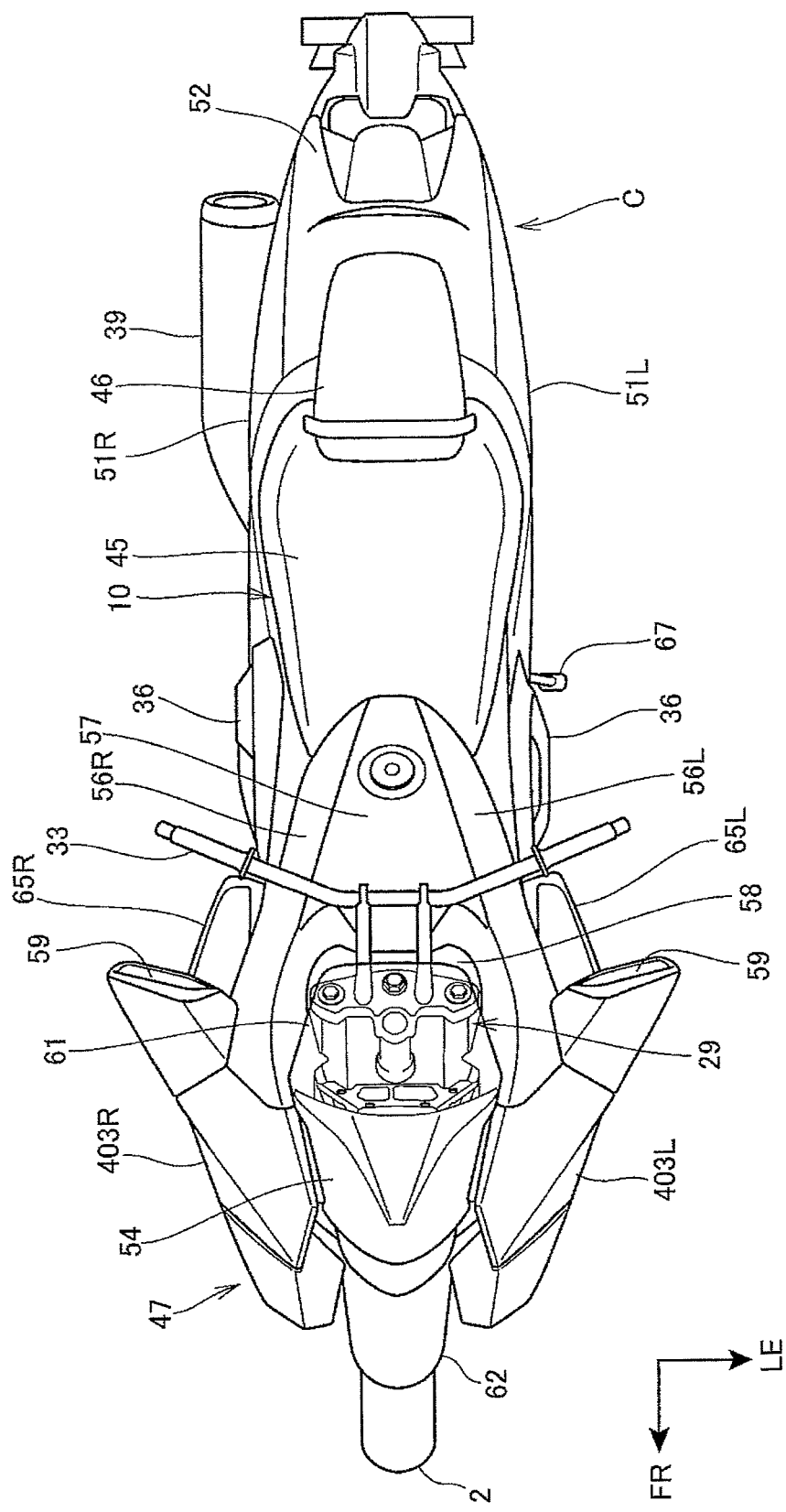
FIG. 4 is a plan view of the motorcycle.

FIG. 1 is a left side view of a motorcycle 1 provided with a locking structure according to the present invention. FIG. 2 is a right side view of the motorcycle 1. FIG. 3 is a front view of the motorcycle 1. FIG. 4 is a plan view of the motorcycle 1.

As shown in FIGS. 1 to 4, the motorcycle 1 is a saddle type vehicle on which a rider is seated astride a seat 10. The motorcycle 1 has a front wheel 2 forwardly of a body frame F. A rear wheel 3 as a driving wheel is rotatably supported on a swing arm 11 disposed at a vehicle rear portion. An engine E is supported on the body frame F forwardly of the seat 10. Most part of the body frame F is covered with a resin-made body cover C.

Figure 5:
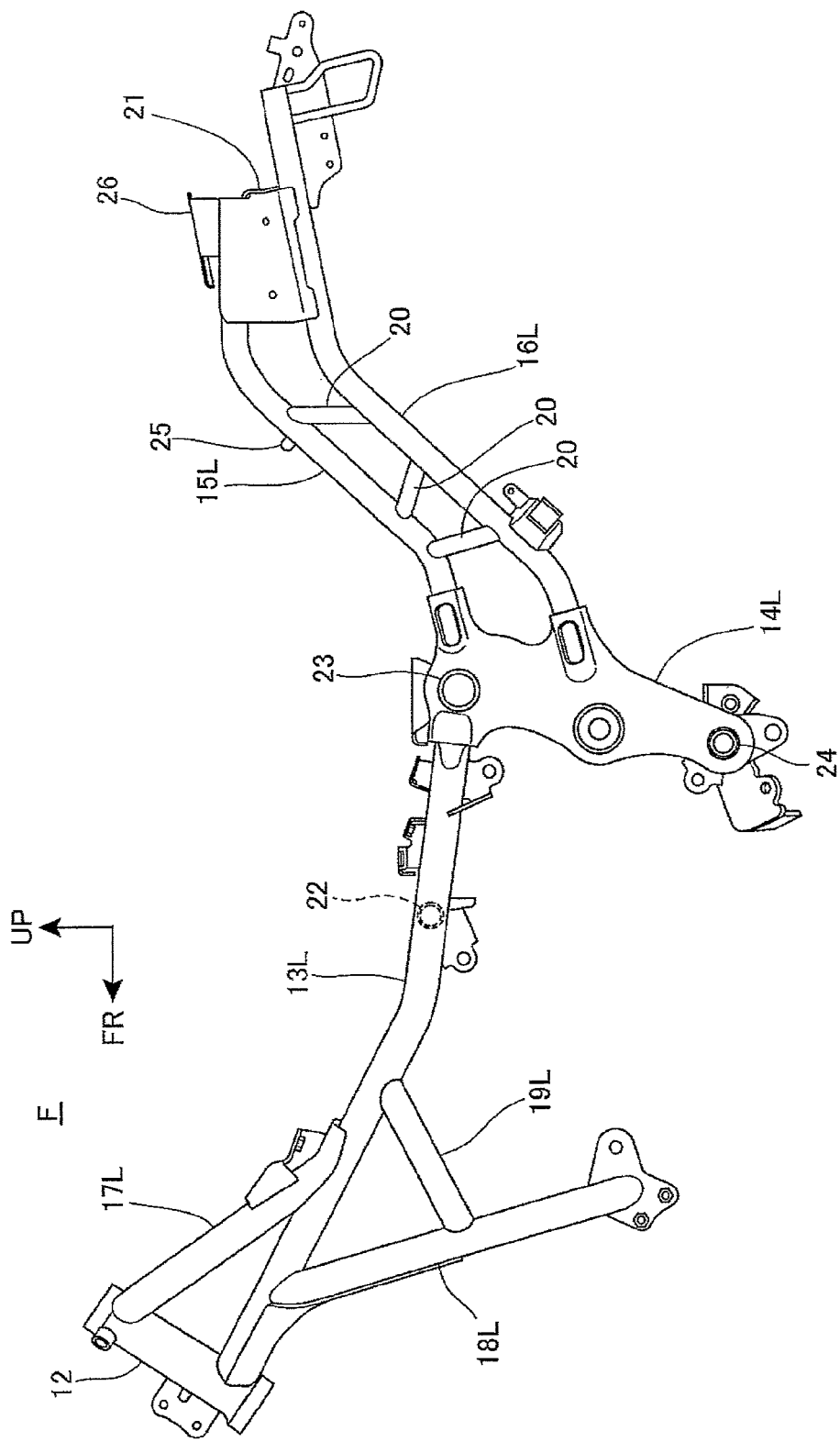
FIG. 5 is a left side view of a body frame.
Figure 6:
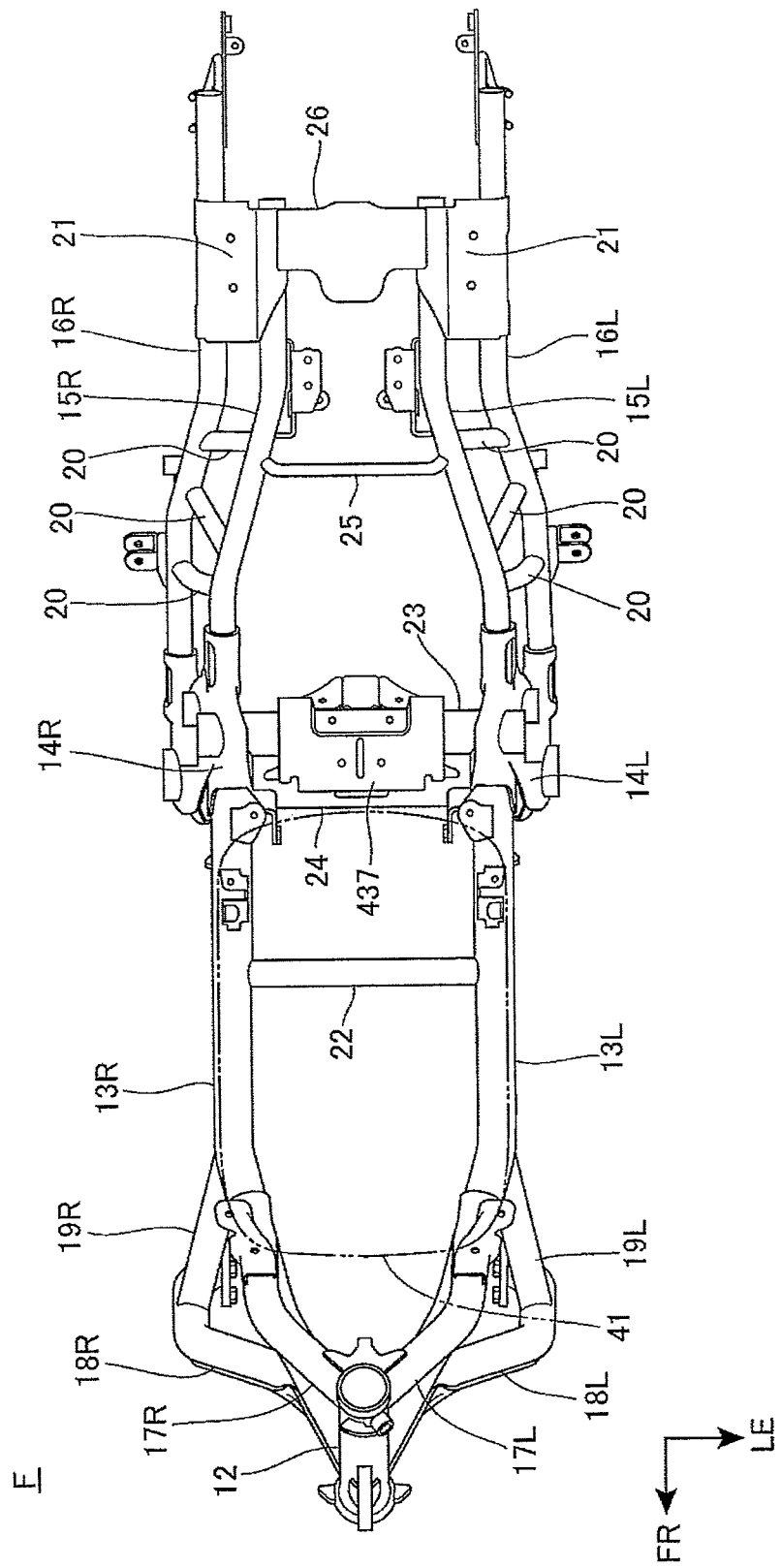
FIG. 6 is a plan view of the body frame.

FIG. 5 is a left side view of the body frame F. FIG. 6 is a plan view of the body frame F.

As shown in FIGS. 1, 5 and 6, the body frame F is formed by interlinking pluralities of metallic pipes and plate members by welding or the like. The body frame F includes a head pipe 12 provided at a front end thereof with a pair of left and right main frames 13L and 13R branched from a lower portion of the head pipe 12 to the left and right sides and extending rearward and downward. A pair of left and right pivot frames 14L and 14R extend downwardly from rear ends of the main frames 13L and 13R with a pair of left and right seat frames 15L and 15R extending rearwardly and upwardly from upper portions of the pivot frames 14L and 14R. A pair of left and right rear frames 16L and 16R extend rearwardly and upwardly from intermediate portions in the vertical direction of the pivot frames 14L and 14R and linked to the seat frames 15L and 15R.

The body frame F is provided with a pair of gusset frames 17L and 17R extending rearwardly and downwardly from an upper portion of the head pipe 12 and linked to front portions of the main frames 13L and 13R with a pair of left and right engine hangers 18L and 18R extending rearwardly and downwardly from front portions of the main frames 13L and 13R. A pair of left and right support frames 19L and 19R extend rearwardly and upwardly from intermediate portions in the vertical direction of the engine hangers 18L and 18R and is linked to the main frames 13L and 13R.

The rear frames 16L and 16R are disposed at vehicle width directionally outer and lower positions in relation to the seat frames 15L and 15R, and extend rearwardly along the rear frames 16L and 16R. Rear ends of the rear frames 16L and 16R are located rearwardly of rear ends of the seat frames 15L and 15R. The seat frames 15L and 15R and the rear frames 16L and 16R are linked together by a plurality of pipe-shaped reinforcement frames 20.

The rear ends of the seat frames 15L and 15R and the rear portions of the rear frames 16L and 16R are linked together by a pair of left and right reinforcement plates 21 which are provided so as to cover the seat frames 15L and 15R and the rear frames 16L and 16R from vehicle width directionally outer sides.

The body frame F is provided with a plurality of cross frames extending in the vehicle width direction and interlinking the left and right frames. The cross frames include a front cross frame 22 interlinking the main frames 13L and 13R with an upper cross frame 23 interlinking upper portions of the pivot frames 14L and 14R. A lower cross frame 24 interlinks lower portions of the pivot frames 14L and 14R with a rear cross frame 25 interlinking intermediate portions in the front-rear direction of the seat frames 15L and 15R. A plate-shaped rear end cross frame 26 interlinks rear end portions of the seat frames 15L and 15R. More specifically, left and right ends of the rear end cross frame 26 are linked respectively to upper surfaces of the reinforcement plates 21.

As shown in FIG. 1, a steering system 29 for steering the front wheel 2 includes a steering shaft (not shown) rotatably supported on the head pipe 12 with a top bridge 30 linked to an upper end of the steering shaft. A bottom bridge 31 is linked to a lower end of the steering shaft with a pair of left and right front forks 32 supported by the top bridge 30 and the bottom bridge 31. The front fork 32 is a telescopic-type shock absorber that includes a spring and a damping force generation mechanism for absorbing and damping a shock. A steering handlebar 33 is provided at an upper portion of the top bridge 30. The front wheel 2 is rotatably supported on lower ends of the front forks 32.

The swing arm 11 is swingably supported by a pivot shaft 34 inserted in the left and right pivot frames 14L and 14R. The swing arm 11 includes a pair of left and right arm parts 35 each extending from a front end portion, which is supported by the pivot shaft 34, to a lateral side of the rear wheel 3. A link part (not shown) links the left and right arm parts 35 together at front portions thereof. The rear wheel 3 is rotatably supported between rear ends of the left and right arm parts 35.

A rear shock absorber unit (not shown) is provided to extend between the swing arm 11 and the upper cross frame 23.

The engine E is a four-stroke engine having a plurality of cylinders in parallel. The engine E includes a crankcase 36 provided with a crankshaft (not shown) and a cylinder unit 37 extending upwardly with a forward inclination from an upper front portion of the crankcase 36. A transmission (not shown) for transmitting power of the engine E to the rear wheel 3 side is incorporated in a rear portion of the crankcase 36. An output of the engine E is transmitted through a drive chain 27 to the rear wheel 3.

As shown in FIGS. 1 and 6, the engine E is linked to the engine hangers 18L and 18R, the main frames 13L and 13R and the pivot frames 14L and 14R, and is mounted on the body frame F in a suspended manner. The cylinder unit 37 is disposed between the left and right engine hangers 18L and 18R.

An exhaust pipe 38 led from a front surface of the cylinder unit 37 is bent and extends rearwardly, to be connected to a muffler 39 (see FIG. 2) which is disposed on the right side of the rear wheel 3. A radiator 28 for cooling water for the engine E is located forwardly of the cylinder unit 37 and under the head pipe 12.

An air cleaner box 40 is disposed upwardly of the cylinder unit 37 and rearwardly of the head pipe 12, and is connected to an intake port of the cylinder unit 37 by way of a connecting tube (not shown) and a throttle body (not shown).

A fuel tank 41 is provided rearwardly of the air cleaner box 40 and adjacent to the air cleaner box 40, and is supported on the main frames 13L and 13R.

The seat 10 includes a main seat 45 on which driver is seated and a rear seat 46 on which to seat a passenger. The main seat 45 is disposed in the manner of being continuous with a rear portion of the fuel tank 41, and is supported on the main frames 13L and 13R. The rear seat 46 is provided rearwardly of the main seat 45, at a position a step higher than the main seat 45.

A pair of left and right driver's steps 65L and 65R are disposed forwardly of the engine E and under the handlebar 33. The driver seated on the main seat 45 puts his/her feet on the steps 65L and 65R while bending his/her knee and lower leg portions on the front side and in the manner of relaxing his/her feet to the front side. As shown in FIGS. 2 and 6, a brake pedal 68 for operating a brake for the rear wheel 3 is provided forwardly of the step 65R on the right side.

The passenger on the rear seat 46 puts his/her feet on a pair of left and right passenger's steps 66L and 66R which are provided below the rear seat 46.

As shown in FIGS. 1 to 4, the body cover C includes a front cover 47 which extends from above the front wheel 2 to the fuel tank 41 side to widely cover a vehicle front portion surrounding the head pipe 12 and a pair of left and right front lower side covers 48L and 48R which extend downwardly from the left and right of a front portion of the front cover 47 to cover an upper rear portion of the front wheel 2 from lateral sides. In addition, the body cover C includes a pair of left and right center side covers 49L and 49R which extend from the rear of the front wheel 2 to the pivot frames 14L and 14R to cover the engine E and the pivot frames 14L and 14R from lateral sides.

The body cover C includes a pair of left and right under covers 50L and 50R which extend from below the engine E to a front portion of the swing arm 11 in continuity with lower edges of the center side covers 49L and 49R and rear side covers 51L and 51R for covering a vehicle portion ranging from the pivot frames 14L and 14R to rear ends of the rear frames 16L and 16R. Further, the body cover C includes a tail cover 52 which is disposed between rear ends of the rear side covers 51L and 51R in a striding manner and a pair of left and right air-passing covers 53L and 53R which are provided between a rear portion of the front cover 47 and front portions of the center side covers 49L and 49R and are provided with air-passing holes. Upper edges of the center side covers 49L and 49R are provided along lower edges of a rear portion of the front cover 47 and lower edges of the main seat 45. Front end portions of the rear side covers 51L and 51R are located between rear end portions of the center side covers 49L and 49R and the under covers 50L and 50R.

A part of the crankcase 36 is not covered with the body cover C but is left exposed to the left and right sides.

The front cover 47 includes a front cover part 54 provided forwardly of the head pipe 12 with a pair of left and right side cover parts 55L and 55R for covering a front portion of the head pipe 12 from the front side and lateral sides. A pair of left and right tank cover parts 56L and 56R cover the air cleaner box 40 and the fuel tank 41 from lateral sides on the rear side of the head pipe 12. An upper cover part 57 links the tank cover parts 56L and 56R together in the left-right direction and covers the air cleaner box 40 and the fuel tank 41 from the upper side.

The front cover part 54, the side cover parts 55L and 55R, the tank cover parts 56L and 56R and the upper cover part 57 are disposed so as to surround the periphery of the head pipe 12, thereby forming the front cover 47. In a central portion of the front cover 47, there is formed a space part 58 (see FIG. 4) permitting the steering system 29 to be rotated inside thereof.

A pair of left and right rear-view mirrors 59 are provided integrally at left and right ends of upper portions of the side cover parts 55L and 55R.

The front cover part 54 is provided with a headlamp 60. A windscreen 61 is provided at a rear portion of the front cover part 54.

A front fender 62 is fixed to the front forks 32. A side stand 67 is attached to the pivot frame 14L on the left side. When the motorcycle 1 is parked using the side stand 67, the motorcycle 1 is in the state of being inclined to the left side.

Figure 7:
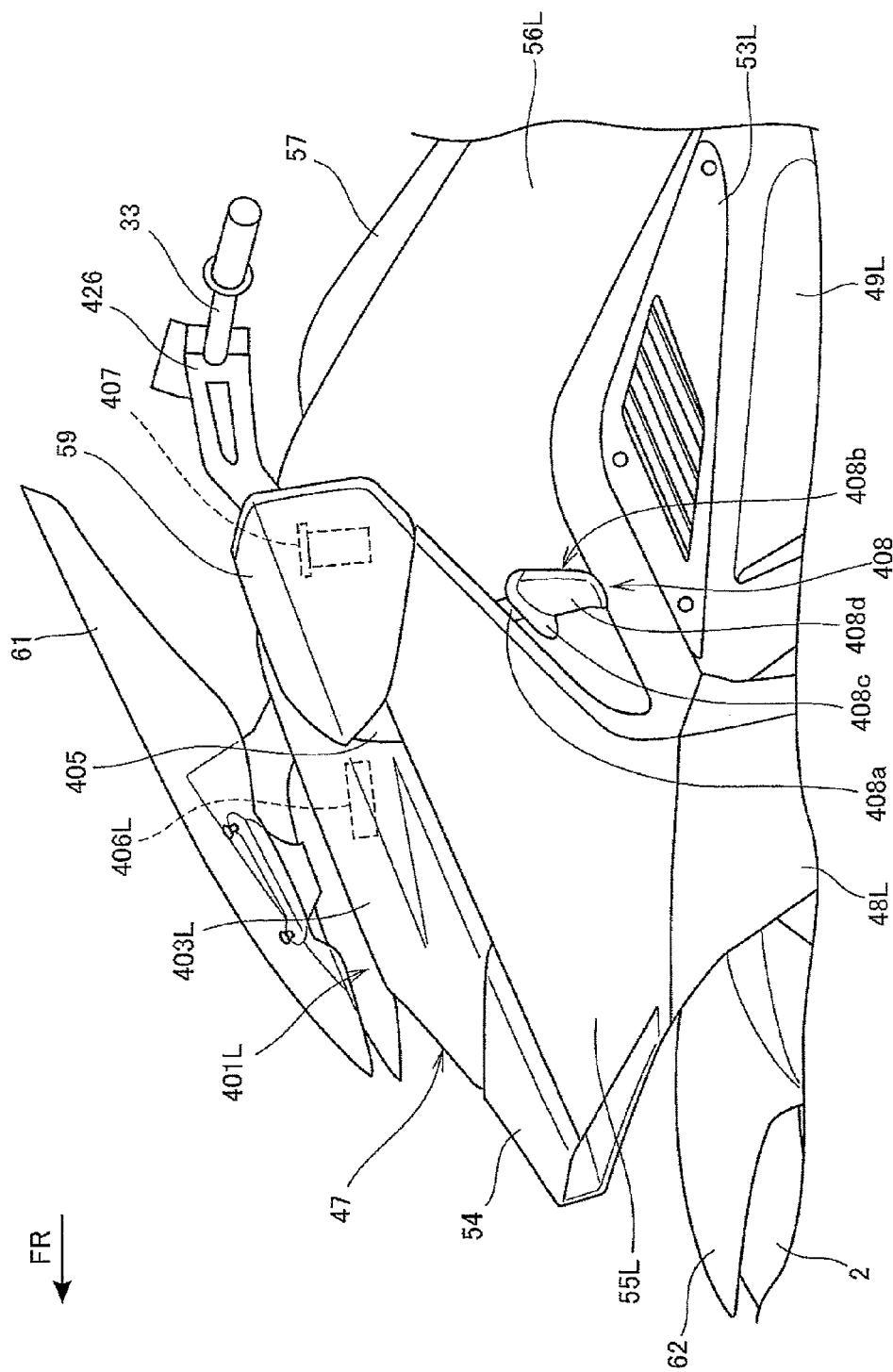
FIG. 7 is a left side view showing a vehicle body front portion of the motorcycle.
Figure 8:
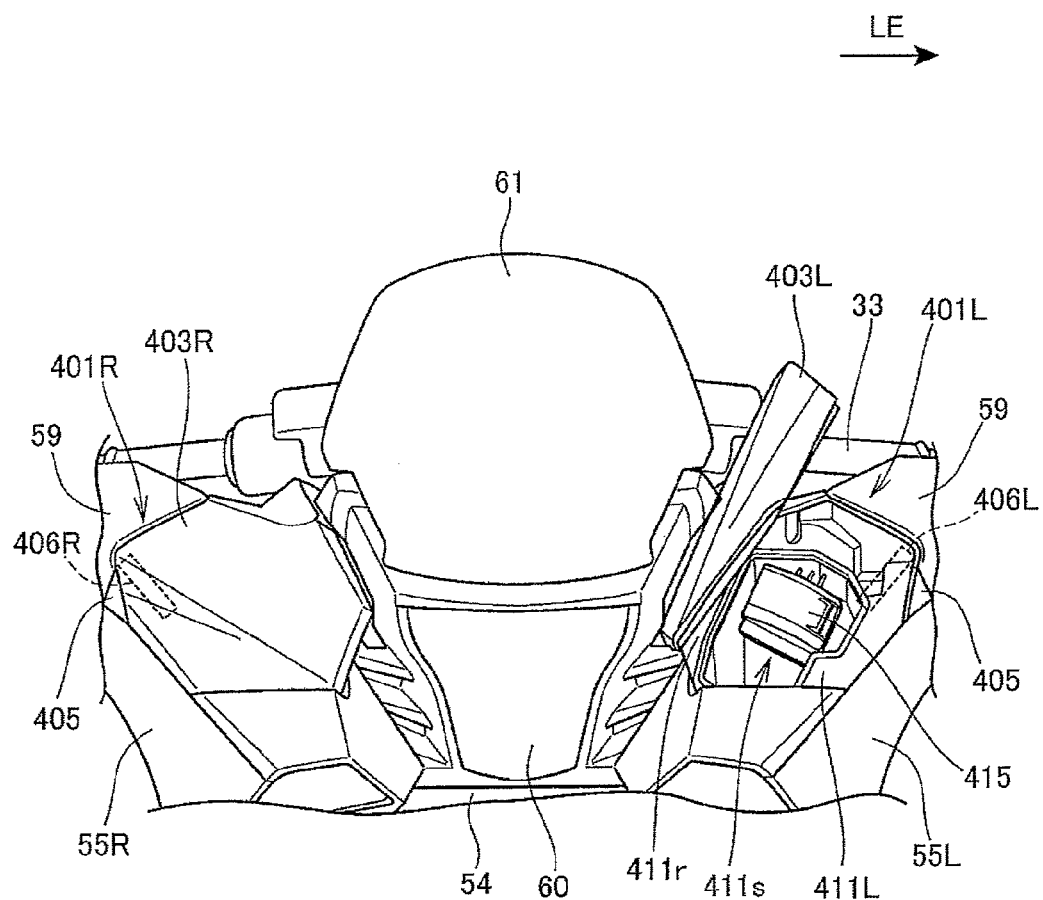
FIG. 8 is an important part front view showing the vehicle body front portion of the motorcycle.

FIG. 7 is a left side view showing a vehicle body front portion of the motorcycle 1. FIG. 8 is an important part front view showing the vehicle body front portion of the motorcycle 1.

As shown in FIGS. 7 and 8, the front cover 47, specifically, the front cover part 54, is provided with a pair of left and right storage parts 401L and 401R. The storage parts 401L and 401R are provided adjacent to the left and right rear-view mirrors 59 and the left and right side cover parts 55L and 55R, and are provided with lids 403L and 403R, respectively. FIG. 8 depicts a state in which the lid 403L on the left side is open. In an area surrounded by the side cover part 55L located below and adjacently to the lid 403L and the rear-view mirror 59 located rearwardly of and adjacently to the lid 403L, there is provided a left-side lid operator 405 formed in a triangular shape in side view (see FIG. 7) for opening the lid 403L. Similarly, in an area surrounded by the side cover part 55R located below and adjacently to the lid 403R and the rear-view mirror 59 located rearwardly of and adjacent to the lid 403R, there is provided a right-side lid operator 405 formed in a triangular shape in side view for opening the lid 403R.

The lid operator 405 is provided to be flush with the surrounding surfaces (the lids 403L and 403R, the side cover parts 55L and 55R, and the rear-view mirrors 59). When the lid operator 405 is pushed to the inner side in the vehicle width direction, lid lock mechanisms 406L and 406R for locking the lids 403L and 403R in a closed state are actuated to unlock the closed state, whereby the lid 403L or the lid 403R is put into an open state. It should be noted here that only the storage part 401L on the left side is provided with a security function (details of which will be described later) which necessitates a predetermined operation together with an operation of the lid operator 405 at the time of opening the lid 403L.

Rearwardly of the left-side storage part 401L and the left-side lid lock mechanism 406L and on the vehicle width directionally inner side of the left-side rear-view mirror 59, there is provided a key cylinder 407 which is connected through cables (not shown) to both the lid lock mechanism 406L and a seat lock mechanism (not shown) for locking for fixation of the detachable main seat 45 (see FIG. 1).

The storage part 401L on the left side and the storage part 401R on the right side are the same in structure, except for a difference between the lid lock mechanism 406L and the lid lock mechanism 406R described above and a difference in the shape of storage space to be described later.

In FIG. 7, a parking brake lever 408 for braking the front wheel 2 or the rear wheel 3 (see FIG. 1) at the time of parking the vehicle extends downwardly from a rear edge portion of the side cover part 55L on the left side. The parking brake lever 408 includes an arm part 408*a* of which one end portion is swingably mounted inside the side cover part 55L and a grip part 408*b* attached to the other end portion of the arm part 408*a*. The grip part 408*b* integrally includes a flange part 408*c* provided at an upper end portion thereof and a straight part 408*d* extending downwardly from the flange part 408*c* to be gripped by hand.

A rear edge portion of the side cover part 55L is bent to the inner side than an outside surface. Therefore, the parking brake lever 408 can be disposed rearwardly of the rear edge portion of the side cover part 55L. Consequently, the parking brake lever 408 can be made inconspicuous when viewed from the front side of the vehicle, and can be restrained from influencing airflow flowing on the lateral side of the vehicle body.

Figure 9:
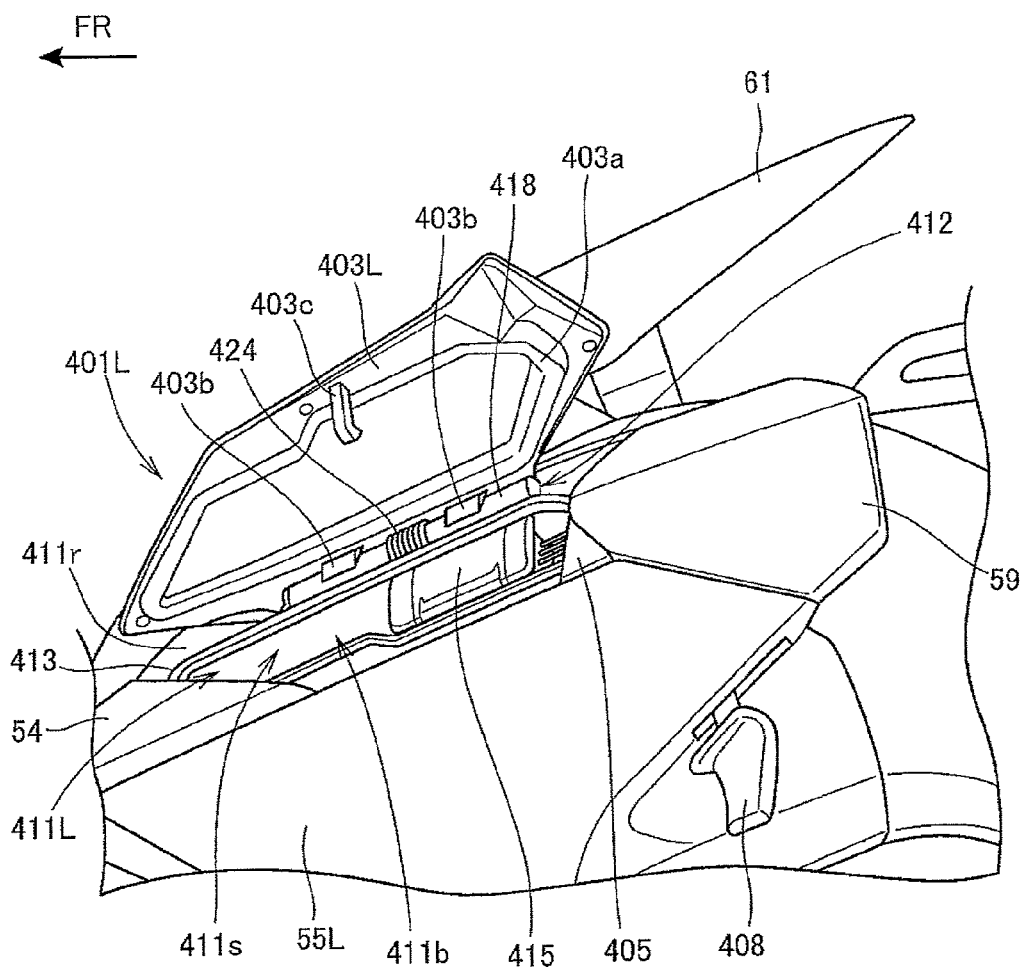
FIG. 9 is a left side view showing a state in which a lid of a storage part is open.
Figure 10:
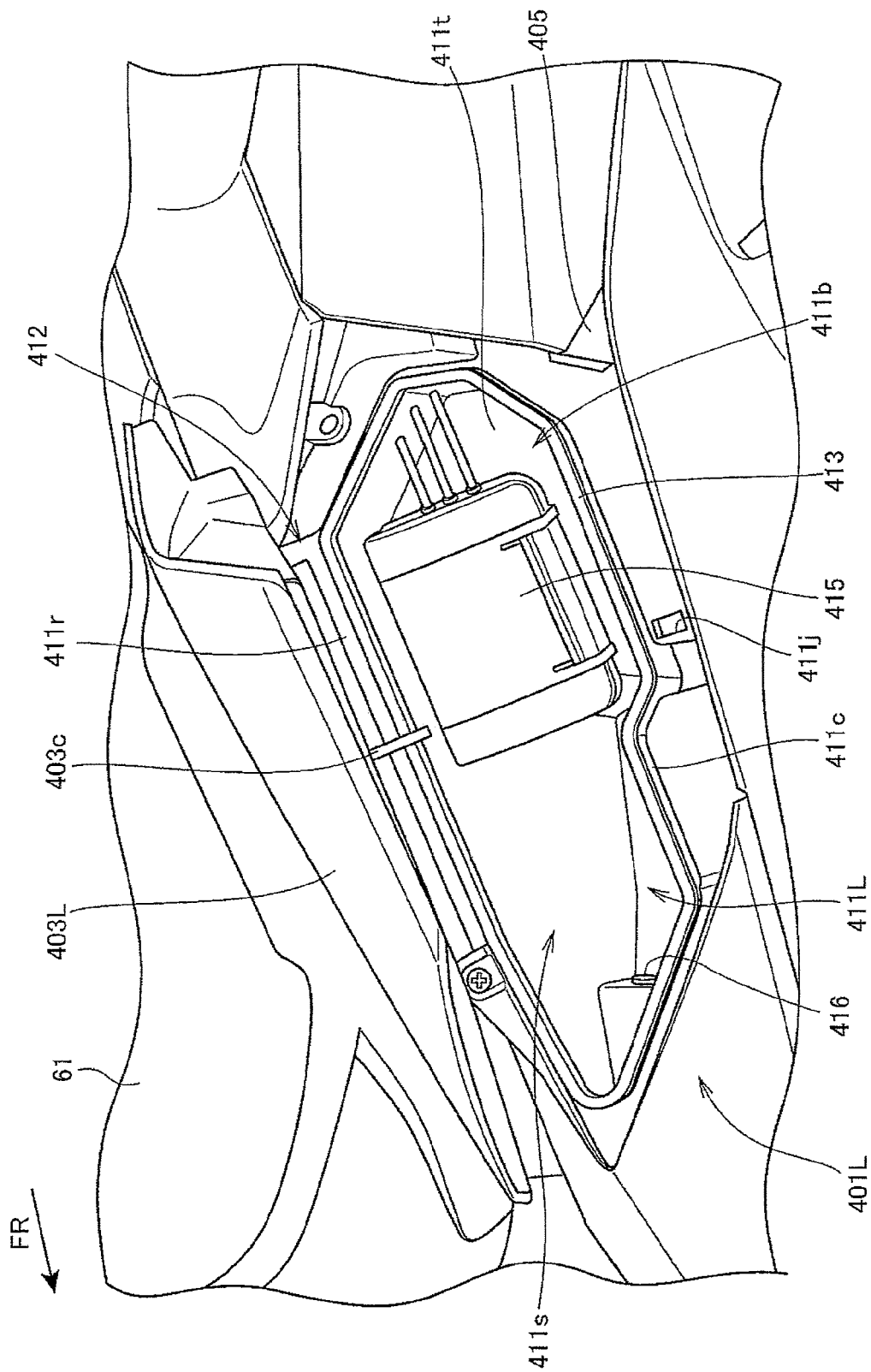
FIG. 10 is a perspective view showing the state in which the lid of the storage part is open.

FIG. 9 is a left side view showing a state in which the lid 403L of the storage part 401L is open. FIG. 10 is a perspective view showing the state in which the lid 403L of the storage part 401L is open.

As shown in FIGS. 9 and 10, the storage part 401L includes a box-shaped storage part main body 411L which is open on the upper side and the lid 403L openably and closably attached through a hinge 412 to an upper-side wall part 411*r* on the vehicle width directionally inner side of the storage part main body 411L. Therefore, the lid 403L constitutes a side opening structure such that the vehicle width directionally outer side thereof is opened to open the storage part main body 411L sideways. In addition, an opening 411*b* of the storage part main body 411L is oriented toward an upper and lateral oblique side of the vehicle body. Together with the side opening structure, this ensures that an article to be stored can be easily put into and taken out of the storage part 401L on the lateral side of the vehicle body.

The storage part main body 411L is provided with a recess 411*s* forming a storage space together with the lid 403L. An endless-formed seal member 413 is attached to a peripheral edge part 411*c* of the opening 411*b* of the recess 411*s*. The lid 403L is formed on the back side thereof with an annular peripheral wall 403*a* which is the same in profile as the peripheral edge part 411*c* of the storage part main body 411L. When the lid 403L is closed, therefore, the peripheral wall 403*a* is pressed against the seal member 413 on the side of the storage part main body 411L. Accordingly, the peripheral wall 403*a* makes secure contact with the seal member 413, whereby penetration of dust, rainwater or the like into the storage part 401L can be prevented.

The interior of the recess 411*s* is formed in a stepped shape. More specifically, a step part 411*t* lower than the opening 411*b* is formed so that a front portion of the recess 411*s* is deep and a rear portion of the recess 411*s* is shallower than the front portion. On the step part 411*t*, there is accommodated, for example, electric equipment such as an ETC in-vehicle unit 415. In the front portion of the storage part 401L, there is provided, for example, a cigar socket 416 as electric equipment.

That portion of the cigar socket 416 in which to fit a cigar plug is provided inside the recess 411*s*. Therefore, penetration of rainwater or dust into the cigar socket 416 can be prevented. Accordingly, stable electrical conduction between the cigar socket 416 and the cigar plug can be secured for a long time. In addition, this structure is such that the cigar plug is fitted into the cigar socket 416 in the direction from the rear side toward the front side. Therefore, the recess 411*s* which is elongated in the longitudinal vehicle direction permits easy fitting of the cigar plug, promising enhanced utility.

The right-side storage part 401R (see FIG. 8) is similar to the left-side storage part 401L in structure, but is not formed therein with the step part 411*t*. In the right-side storage part 401R, a front portion and a rear portion of the recess in the storage part main body are both formed to be deep, so that a storage capacity greater than that of the left-side storage part 401L is secured.

Figure 11:
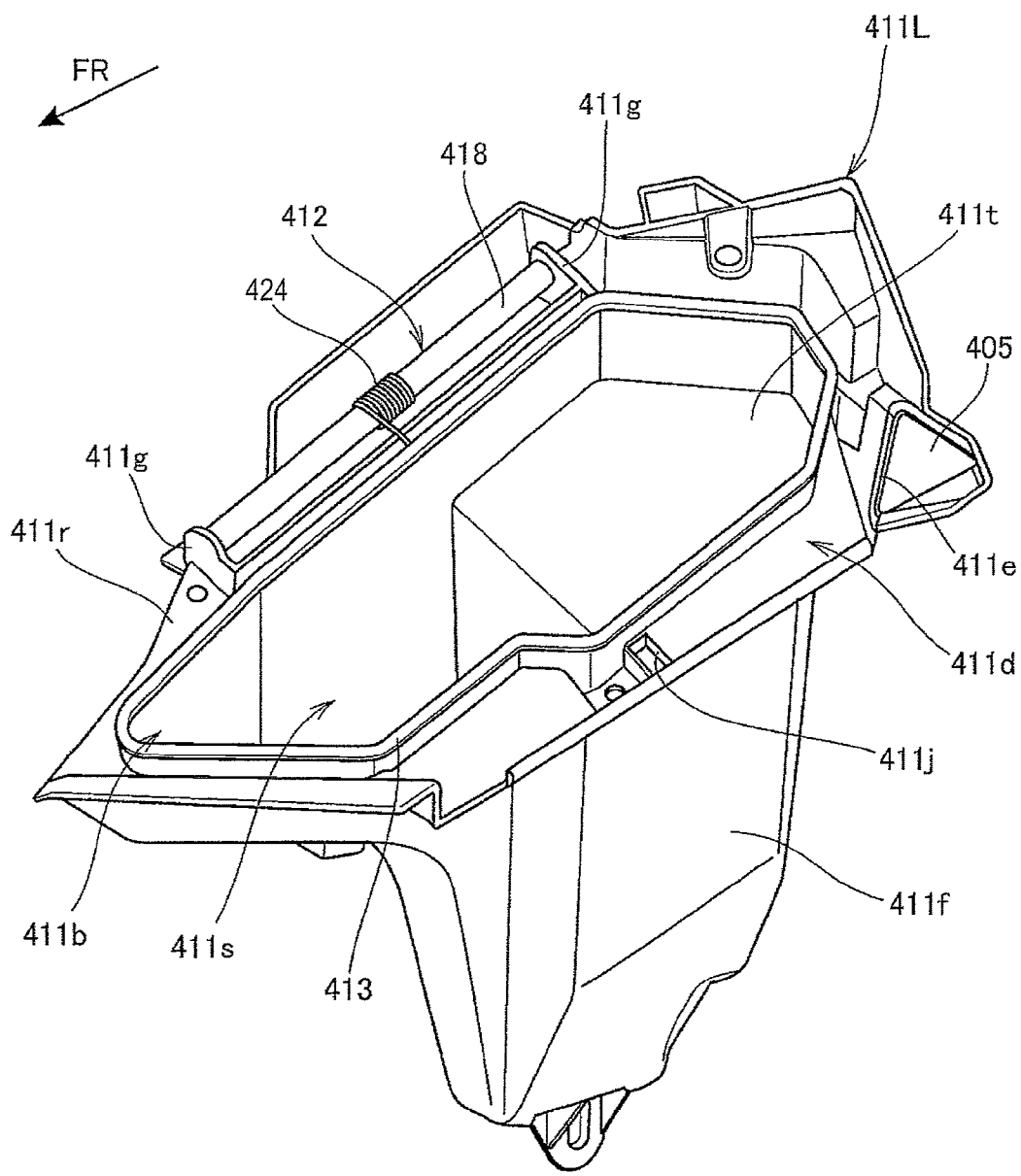
FIG. 11 is a perspective view showing a storage part main body and a hinge.
Figure 12:
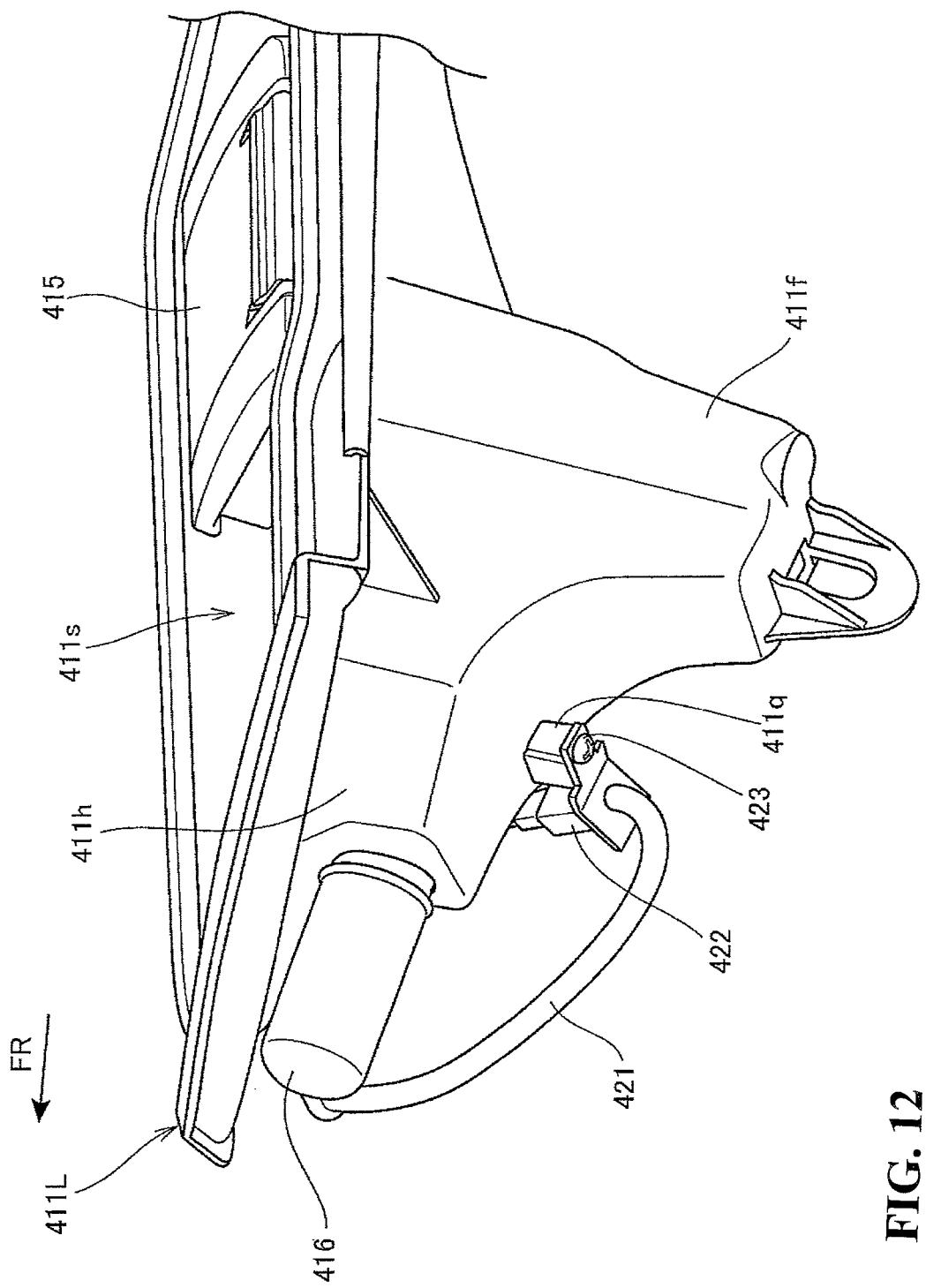
FIG. 12 is a perspective view showing an important part of the storage part main body.

FIG. 11 is a perspective view showing the storage part main body 411L and the hinge 412, and FIG. 12 is a perspective view showing an important part of the storage part main body 411L.

The storage part main body 411L includes an opening periphery portion 411*d* formed to surround the opening 411*b* with an operator insertion hole 411*e* provided in the opening periphery portion 411*d* for insertion of the lid operator 405 therein. A lower storage part 411*f* is formed under the opening periphery portion 411*d*.

Since the ETC in-vehicle unit 415 (see FIG. 10) is disposed on the step part 411*t* at a high position inside the recess 411*s*, an ETC card can be easily inserted into and drawn out of the ETC in-vehicle unit 415. Thus, enhanced usability can be secured.

In addition, since the storage part main body 411L is provided with the operator insertion hole 411*e* for inserting the lid operator 405 therein, the storage part main body 411L can be assembled onto the vehicle body in a production line, with the lid operator 405 preliminarily sub-assembled onto the storage part main body 411L. Thus, enhanced productivity can be ensured.

The lower storage part 411*f* is formed at an upper portion thereof with an upper bulging wall 411*h* bulging toward the vehicle body front side. The cigar socket 416 elongated in the front-rear direction is attached to the upper bulging wall 411*h*. Wiring 421 is connected to the cigar socket 416 with a connector 422 attached to a tip portion of the wiring 421. The connector 422 is screwed onto a connector attachment part 411*q* formed integrally with a lower portion of the upper bulging wall 411*h* by a screw 423. Thus, the storage part main body 411L is provided with the connector attachment part 411*q* to which to attach the connector 422, whereby the number of component parts can be reduced as compared with the case where an attachment part for the connector 422 is specially provided. Consequently, a reduction in cost can be achieved.

The hinge 412 is composed of a pair of front and rear main body-side hinge parts 411g with a hinge shaft 418 and lid-side hinge parts 403b (see FIG. 9). The main body-side hinge parts 411g are formed integrally with an upper wall part 411r on the vehicle width directionally inner side of the opening periphery portion 411d at positions spaced apart along the front-rear direction. The hinge shaft 418 is rotatably arranged between the main body-side hinge parts 411g. The lid-side hinge parts 403b, which are formed integrally with the lid 403L (see FIG. 9), are attached to the hinge shaft 418. A torsion coil spring 424 is wound around a central portion of the hinge shaft 418. The torsion coil spring 424 biases the lid 403L in a direction for opening in relation to the storage part main body 411L.

Figure 13:
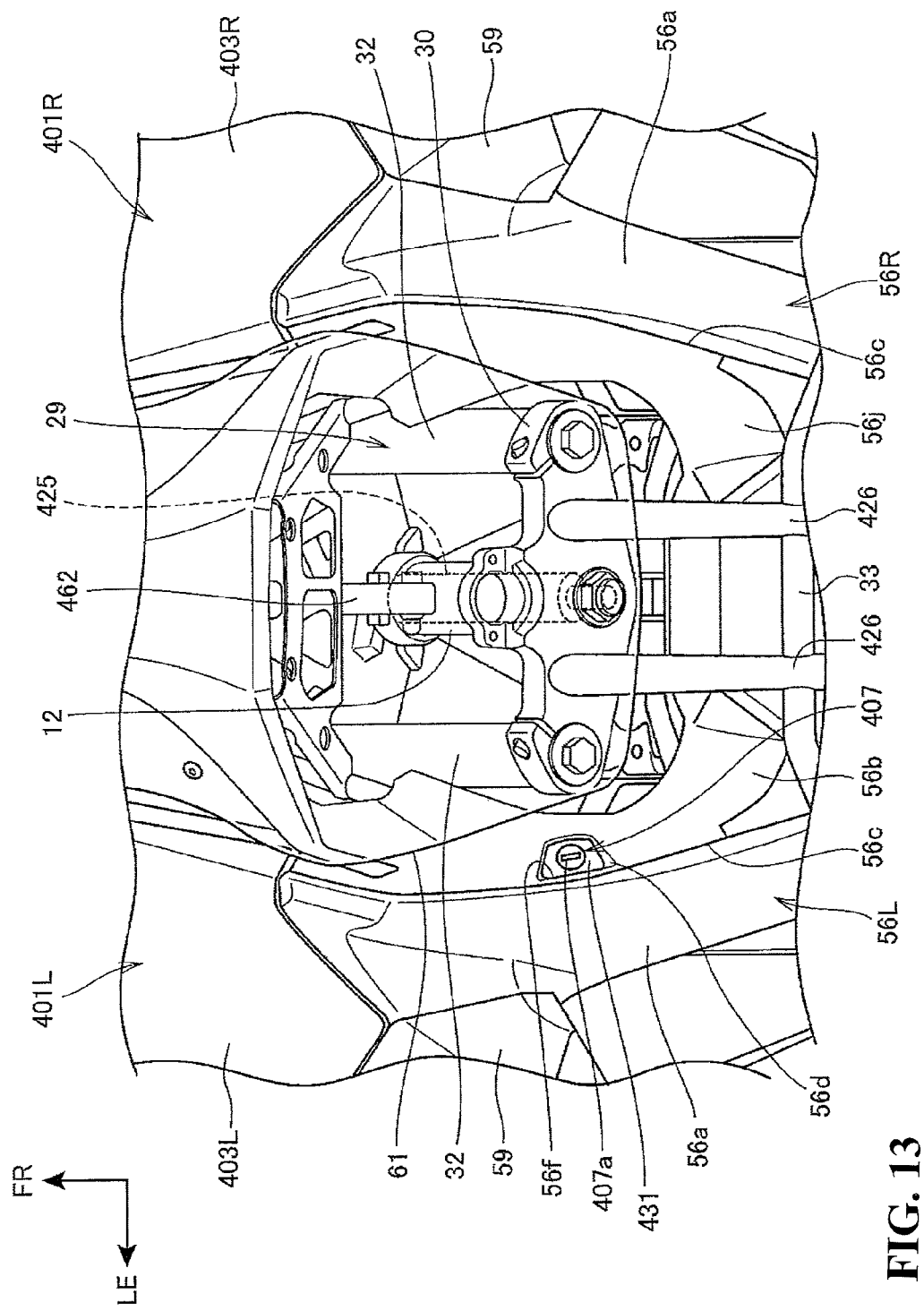
FIG. 13 is an important part plan view showing the vehicle body front portion of the motorcycle.
Figure 14:
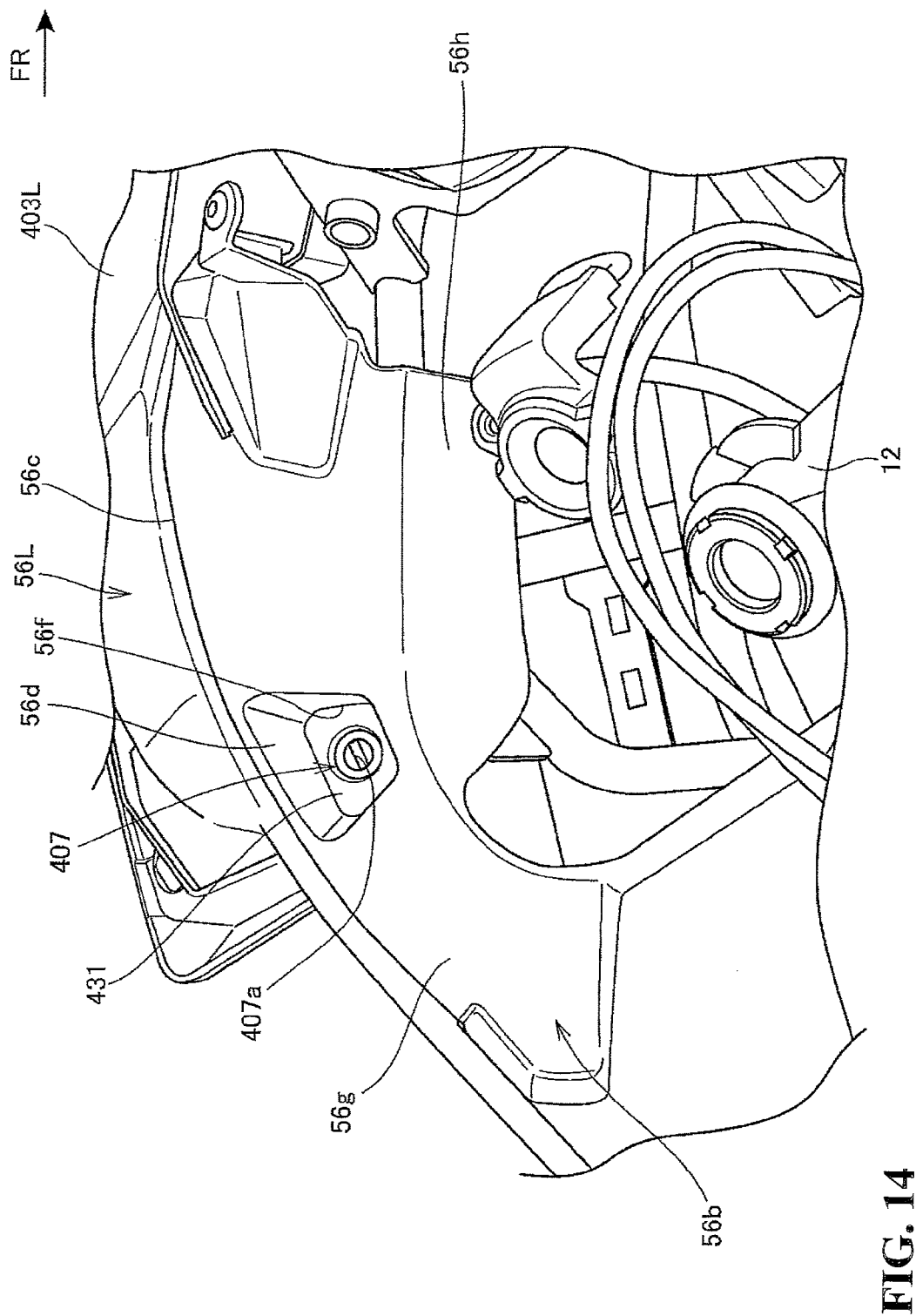
FIG. 14 is an important part perspective view showing the vehicle body front portion of the motorcycle.

FIG. 13 is an important part plan view showing the vehicle body front portion of the motorcycle 1. FIG. 14 is an important part perspective view showing the vehicle body front portion of the motorcycle 1.

As shown in FIGS. 13 and 14, the tank cover parts 56L and 56R are provided at their front portions with outer covers 56a which are each adjacent to the rear-view mirror 59 and inner covers 56b and 56j which are formed at the inner side of the outer covers 56a in an integral fashion. Edge lines 56c as boundaries between the outer covers 56a and the inner covers 56b and 56j are each formed in a roughly arcuate shape projected to the vehicle width directionally outer side.

The inner cover 56b on the left side is formed with a recess 56d. A roughly trapezoidal opening 56f is formed in the bottom of the recess 56d. Inside the opening 56f, there are exposed a key insertion hole 407a of the key cylinder 407, a peripheral portion of the key cylinder 407, and a part of a decorative laminate 431 which will be described in detail later.

The inner cover 56b includes a first inclined surface 56g formed so as to slope down from the edge line 56c and a second inclined surface 56h formed so as to slope down from an edge portion of the first inclined surface 56g at a steeper angle than the first inclined surface 56g. The first inclined surface 56g is formed with the recess 56d, and the second inclined surface 56h is formed at an inclination angle close to the vertical. With the second inclined surface 56h thus provided, the key cylinder 407 disposed below the first inclined surface 56g can be prevented from being exposed from a gap between the inner cover 56b and the head pipe 12. Thus, tampering with the key cylinder 407 can be prevented.

The key cylinder 407 is disposed in the same position, in the longitudinal vehicle direction, as the top bridge 30 constituting the steering system 29. More specifically, the key cylinder 407 is disposed in the same position, in the vehicle longitudinal direction, as an upper end portion of the steering shaft 425 rotatably supported inside the head pipe 12.

The handlebar 33 is supported by a pair of left and right handlebar holders 426 which are attached to the top bridge 30.

Figure 15:
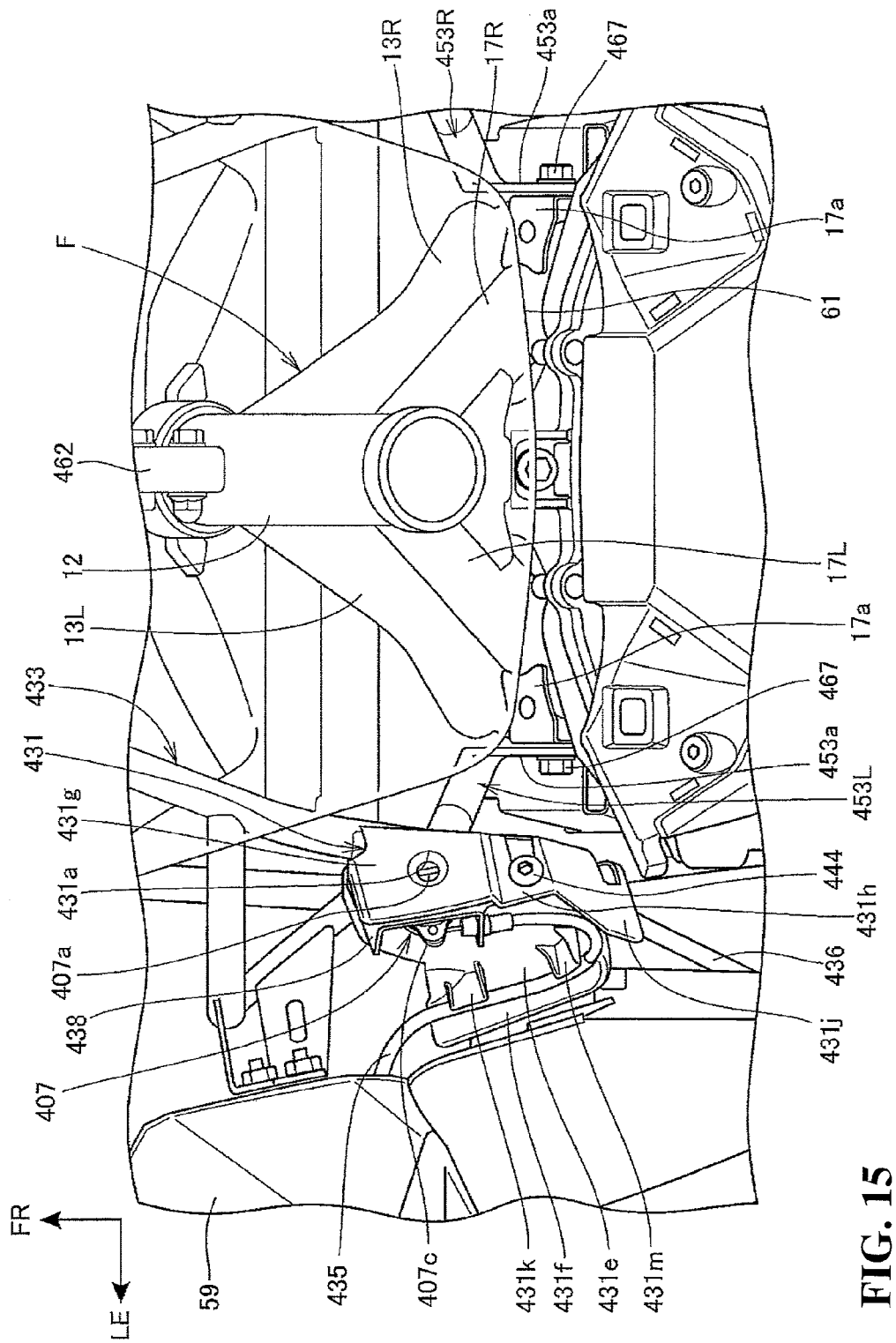
FIG. 15 is an important part plan view showing a state in which a tank cover is removed from the vehicle body front portion.

FIG. 15 is an important part plan view showing a state in which the tank cover parts 56L and 56R (see FIG. 13) are removed from the vehicle body front portion.

The key cylinder 407 covered with the decorative laminate 431 is disposed under the left-side tank cover part 56L. The decorative laminate 431 has a circular opening 431a formed in an upper portion thereof. The key insertion hole 407a of the key cylinder 407 and a surrounding portion of the key insertion hole 407a are exposed via the opening 431a. The opening 431a is formed smaller than the opening 56f (see FIG. 13) formed in the inner cover 56b (see FIG. 13).

Thus, the upper side of the key cylinder 407 is covered with the decorative laminate 431 formed with the opening 431a. Further, as shown in FIG. 13, the upper side of the decorative laminate 431 is covered with the inner cover 56b formed with the opening 56f larger than the opening 431a. This ensures that even if there is an assembly-basis scattering of the positional relationship between the opening 431a of the decorative laminate 431 and the opening 56f of the inner cover 56b. Thus, errors in the positional relationship between the opening 431a of the decorative laminate 431 and the opening 56f of the inner cover 56b can be made inconspicuous. Accordingly, a good external appearance can be secured while maintaining the positional relationship between the key insertion hole 407a and the opening 431a of the decorative laminate 431.

The key cylinder 407 is supported by a front sub-frame 433 mounted to a front portion of the body frame F. Two cables, namely, a first cable 435 and a second cable 436, extend from the key cylinder 407 toward the vehicle body front side and toward the vehicle body rear side, respectively, with their one-side ends connected to the key cylinder 407.

Figure 16:
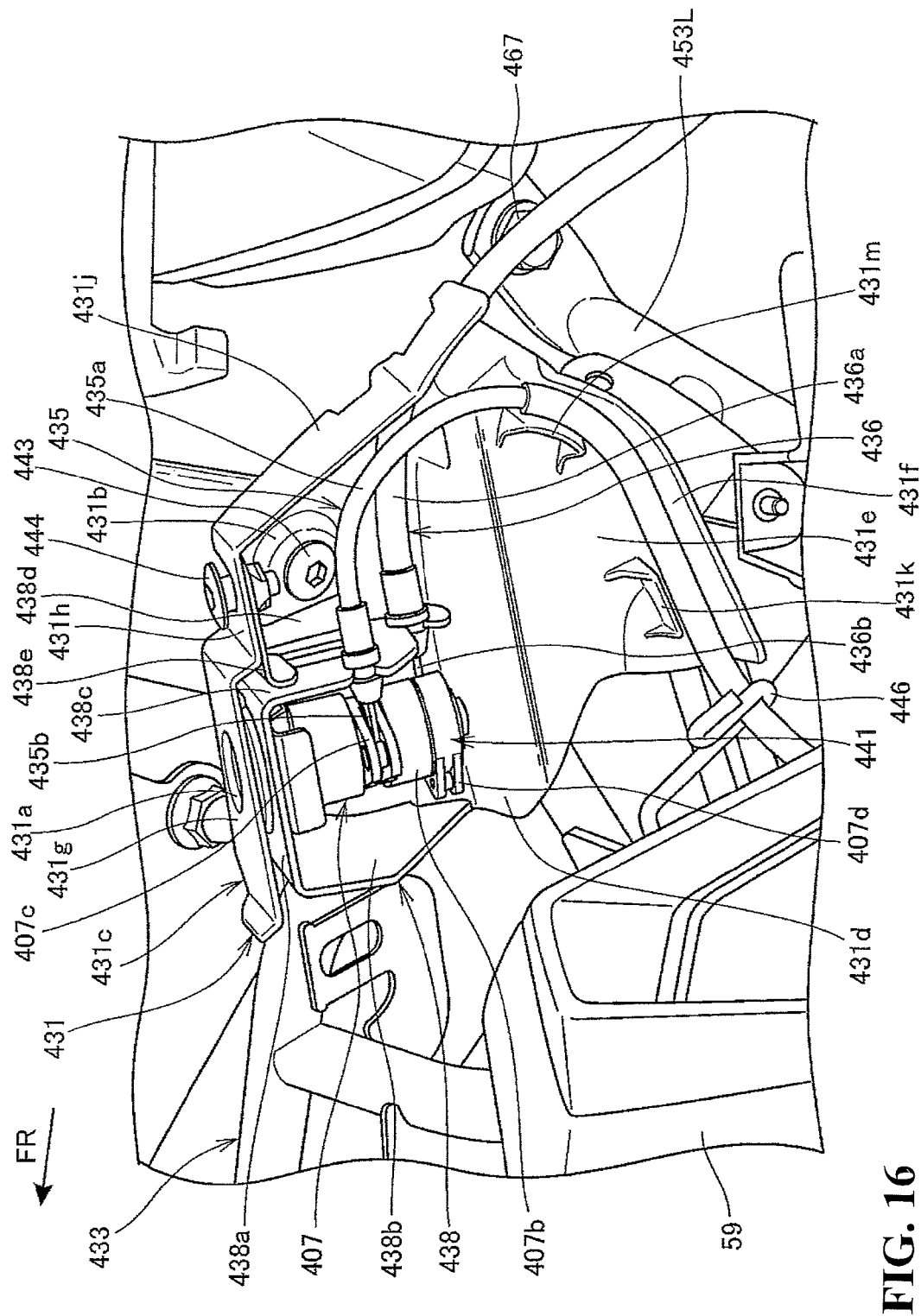
FIG. 16 is a perspective view showing a key cylinder and the surroundings thereof.

FIG. 16 is a perspective view showing the key cylinder 407 and the surroundings thereof.

The front sub-frame 433 has a key cylinder holding part 438 formed by bending a steel sheet. The key cylinder 407 is disposed inside the key cylinder holding part 438. The key cylinder holding part 438 integrally includes an upper wall 438a, a front wall 438b, a rear wall 438c and an inside wall 438d. An upper portion of the key cylinder 407 is attached to the upper wall 438a. The front wall 438b, the rear wall 438c and the inside wall 438d cover the key cylinder 407 respectively on the front side, rear side and inside of the latter.

The first cable 435 is composed of an outer cable 435a constituting an outside portion and an inner wire 435b movably inserted in the outer cable 435a. The outer cable 435a has its tip portion attached to an edge portion on the vehicle width directionally outer side of the rear wall 438c. The inner wire 435b has its tip portion linked to a first arm part 407c projecting from a peripheral portion 407b of the key cylinder 407. The other end portion of the first cable 435 is connected to the left-side lid lock mechanism 406L (see FIG. 7).

Similarly, the second cable 436 is composed of an outer cable 436a constituting an outside portion and an inner wire 436b movably inserted in the outer cable 436a. The outer cable 436a has its tip portion attached to a lower edge portion on the vehicle width directionally inner side of the rear wall 438c. The inner wire 436b has its tip portion linked to a second arm part 407d projecting from the peripheral portion 407b of the key cylinder 407. The other end portion of the second cable 436 is connected to the seat lock mechanism 437 attached to an upper portion of the lower cross frame 24, which constitutes the body frame F, in FIG. 6.

The key cylinder 407 is composed mainly of an outer cylinder 441, an inner cylinder (not shown) rotatably inserted in the outer cylinder 441 and a plurality of tumblers (not shown) arranged between the outer cylinder 441 and the inner cylinder. The inner cylinder is provided in its upper end portion with the key insertion hole 407a (see FIG. 15).

When the key is not inserted in the inner cylinder of the key cylinder 407, the tumblers are spanningly disposed between the outer cylinder 441 and the inner cylinder; in this state, the inner cylinder cannot be rotated relative to the outer cylinder 441. When the key is inserted into the inner cylinder, the tumblers corresponding to a groove (grooves) or a ridge (ridges) formed on the key are moved between the outer cylinder 441 and the inner cylinder. In this case, since all the tumblers are located on the outer cylinder 441 side or the inner cylinder side, the inner cylinder can be rotated clockwise or counterclockwise within the outer cylinder 441.

Since the first arm part 407c and the second arm part 407d are integrally attached to the inner cylinder, they can be rotated together with the inner cylinder. In a state where the key is inserted in the key cylinder 407 via the key insertion hole 407a, a clockwise rotation, for example, of the key causes the first arm part 407c to rotate clockwise, and a counterclockwise rotation of the key causes the second arm part 407d to rotate counterclockwise. When the first arm part 407c is rotated clockwise, the inner wire 435b of the first cable 435 is pulled. When the second arm 407d is rotated counterclockwise, the inner wire 436b of the second cable 436 is pulled.

The decorative laminate 431 integrally includes an inside portion 431b, an upper belt-like portion 431c, a lower-side covering portion 431d, a downwardly extending portion 431e, and a lower guide portion 431f.

The inside portion 431b is fastened to the inside wall 438d of the key cylinder holding part 438, roughly in the vehicle width direction, by a bolt 443. The upper belt-like portion 431c extends vehicle width directionally outwardly from an upper edge of the inside portion 431b, and extends along the longitudinal vehicle direction while bending. The lower-side covering portion 431d extends vehicle width directionally outwardly from a lower edge of the inside portion 431b, and covers the lower side of the key cylinder 407. The downwardly extending portion 431e extends downwardly from a side edge of the lower-side covering portion 431d. The lower guide portion 431f is a portion which extends vehicle width directionally outwardly from a lower edge of the downwardly extending portion 431e and which is formed to extend rearwardly upwardly. The lower guide portion 431f guides the first cable 435 so that the first cable 435 in the state of extending rearwardly from the key cylinder 407 side further makes a U-turn downwardly and forwardly.

The upper belt-like portion 431c is composed of an upper step portion 431g, a lower step portion 431h, and an upper guide portion 431j. The upper step portion 431g is formed with a round opening 431a. The lower step portion 431h is fastened to a rearwardly extending portion 438e, which extends rearwardly from the rear wall 438c of the key cylinder holding part 438, roughly in the vertical direction by a bolt 444. The upper guide portion 431j is a portion sloping down rearwardly, by which the second cable 436 extending from the key cylinder 407 side is guided, from above, so as to extend along a rearward and downward oblique direction.

The lower-side covering portion 431d covers, from below, the key cylinder 407 and respective tip portions of the first cable 435 and the second cable 436. The downwardly extending portion 431e is integrally provided on its outside surface with projections 431k and 431m for positioning the first cable 435 from above. This structure ensures that the first cable 435 is positioned by being clamped between the projections 431k and 431m and the lower guide portion 431f.

The above-mentioned inside portion 431b is fastened to the inside wall 438d roughly in the vehicle width direction, whereas the lower step portion 431h is fastened to the rearwardly extending portion 438e roughly in the vertical direction. Therefore, the decorative laminate 431 can be enhanced in mounting accuracy in the vehicle width direction, the longitudinal vehicle direction and the vertical direction. Consequently, as shown in FIG. 15, the positional accuracy of the opening 431a of the decorative laminate 431 in relation to the key insertion hole 407a of the key cylinder 407 can be enhanced, and external appearance can be enhanced.

Figure 17:
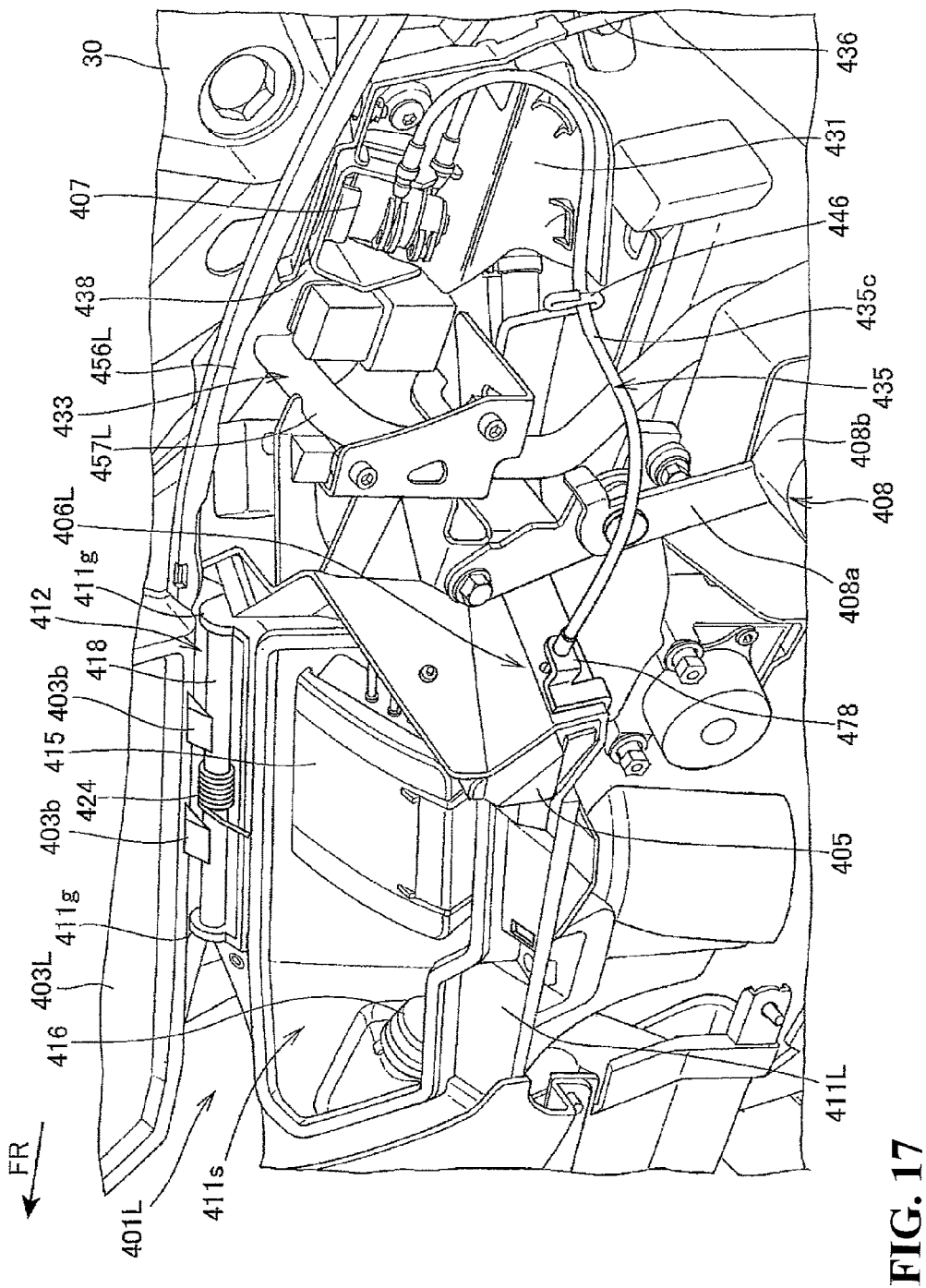
FIG. 17 is a perspective view showing a connection part between the key cylinder and a lid lock mechanism.

FIG. 17 is a perspective view showing a connection part between the key cylinder 407 and the lid lock mechanism 406L.

The lid mechanism 406L provided in the storage part 401L on the left side of the vehicle body front portion and the key cylinder 407 are connected together by the first cable 435. The lid lock mechanism 406L is provided in a rear lower portion of the storage part 401L, and is disposed on the vehicle width directionally inner side of the lid operator 405. The key cylinder 407 is disposed on the vehicle body rear side and on the vehicle width directionally inner side as compared with the storage part 401L. Therefore, the first cable 435 once extends from the key cylinder 407 toward the vehicle body rear side, then makes a U-turn toward the vehicle body front side, further extends vehicle width directionally outwardly, then bends and extends toward the vehicle body front side, and is connected to the lid lock mechanism 406L. At an intermediate portion of the first cable 435, a bent portion 435c is formed by supporting of the first cable 435 with a wire-like hook 446 provided on the front sub-frame 433.

In addition to the function of locking the lid 403L in a closed state, the lid lock mechanism 406L has a function of maintaining the lid 403L in the closed state when the lid operator 405 on the storage part 401L side is operated without performing a predetermined operation at the time of opening the lid 403L.

The above-mentioned predetermined operation is to insert the key into the key cylinder 407 and rotate the key clockwise. More specifically, when the key is inserted into the key cylinder 407 and rotated clockwise, the inner wire 435b of the first cable 435 shown in FIG. 16 is pulled, and, when the lid operator 405 shown in FIG. 9 is pushed in this condition, the locking by the lid lock mechanism 406L is canceled, so that the lid 403L can be opened. A detailed structure and operation of the lid lock mechanism 406L will be described referring to FIGS. 20(A) and 20(B) and 21(A) to 21(C).

Such a predetermined operation as above-mentioned is required only for the left-side storage part 401L. Thus, the lid lock mechanism 406R provided on the right-side storage part 401R as shown in FIG. 8 has only a function of simply locking the lid 403R in a closed state or unlocking the lid 403R from the closed state. In other words, the right-side lid mechanism 406R is not linked to the key cylinder 407. Whenever the right-side lid operator 405 is pushed, therefore, the locking by the lid lock mechanism 406R is canceled, so that the lid 403R is put into an open state.

The lids 403L and 403R (for the lid 403R, see FIG. 8) are each being biased toward an open state by the torsion coil springs 424 provided in the hinge 412. When the lid operator 405 is operated and the locking by the lid lock mechanism 406L and 406R (for the lid lock mechanism 406R, see FIG. 8) is canceled, the lids 403L and 403R spontaneously move into an open state. Thus, a rotating operation is omitted, whereby enhanced convenience is ensured. More specifically, in the case of opening the left-side storage part 401L as above-mentioned, the operation of the key cylinder 407 is required in addition to the operation of the lid operator 405. Accordingly, a high effect on a convenience basis can be obtained.

When the key is inserted into the key cylinder 407 and the key is rotated counterclockwise in FIG. 16, the inner wire 436b of the second cable 436 is pulled, so that the locking by the seat lock mechanism 437 is canceled. Consequently, the main seat 45 (see FIG. 10) can be detached.

Figure 18:
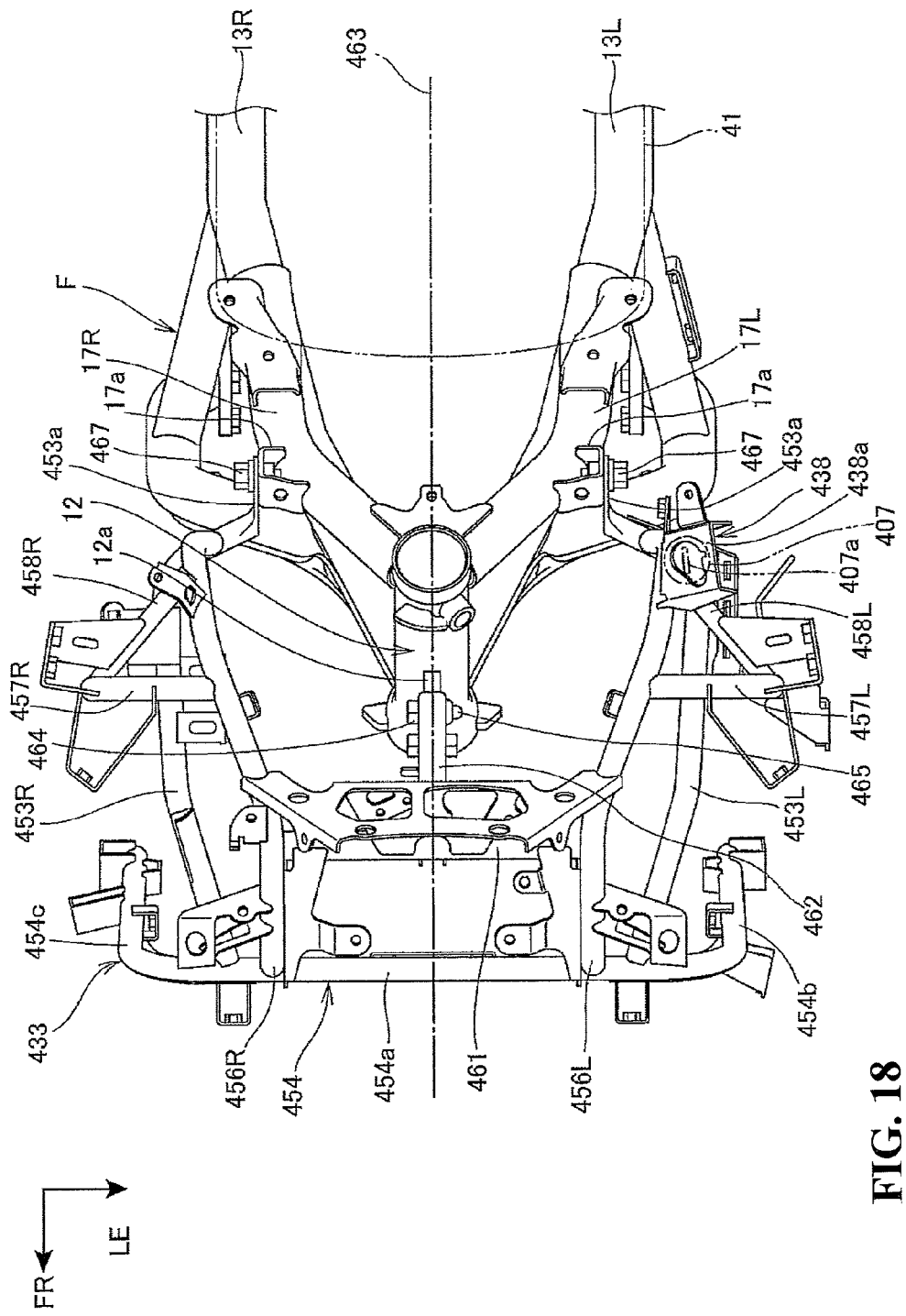
FIG. 18 is a plan view showing a front portion of the body frame and a front sub-frame.
Figure 19:
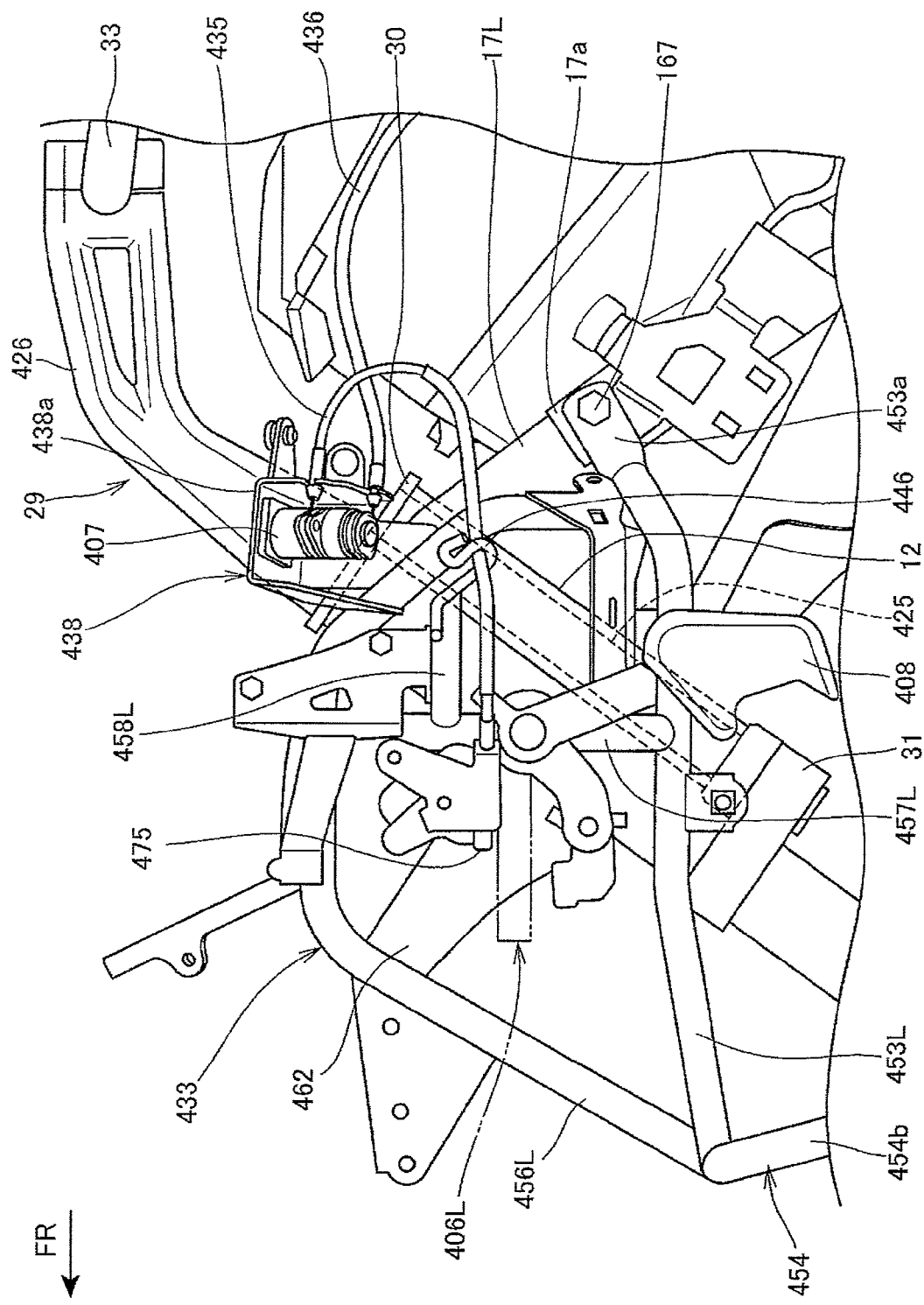
FIG. 19 is a side view showing the front sub-frame provided at the vehicle body front portion.

FIG. 18 is a plan view showing a front portion of the body frame F and the front sub-frame 433, and FIG. 19 is a side view showing the front sub-frame 433 provided at the vehicle body front portion.

As shown in FIGS. 18 and 19, the front sub-frame 433 includes a pair of left and right first longitudinally extending frames 453L and 453R, a front cross frame 454, a pair of left and right second longitudinally extending frames 456L and 456R, a pair of left and right side link frames 457L and 457R, side inclined frames 458L and 458R, a link cross frame 461, and a center bracket 462. Note that numeral 463 denotes a vehicle body center line extending along the longitudinal vehicle direction through the center in the vehicle width direction.

The first longitudinally extending frames 453L and 453R have their rear end portions 453a attached to brackets 17a (which are provided on the gusset frames 17L and 17R) by bolts 467, respectively. The rear end portion 453a is a portion formed by compressing a pipe into a flat shape. Thus, it is shaped to be suitable for attachment to the bracket 17a. The front cross frame 454 has a structure wherein a rectilinear portion 454a extending rectilinearly in the vehicle width direction and a pair of left and right vertically extending portions 454b and 454c formed by bending downwardly from both ends of the rectilinear portion 454a are formed as one body. The rectilinear portion 454a is attached to front ends of the left and right first longitudinally extending frames 453L and 453R.

The second longitudinally extending frames 456L and 456R are arranged so as to extend longitudinally between rear portions of the first longitudinally extending frames 453L and 453R and the front cross frame 454 and to be curved in an upwardly projected shape. The side link frames 457L and 457R are arranged so as to extend vertically between the first longitudinally extending frame 453L and the second longitudinally extending frame 456L and between the first longitudinally extending frame 453R and the second longitudinally extending frame 456R, respectively, and to be curved in a shape which is projected to the vehicle width directionally outward side.

The side inclined frames 458L and 458R are arranged so as to extend horizontally and rectilinearly between the second longitudinally extending frame 456L and the side link frame 457L and between the second longitudinally extending frame 456R and the side link frame 457R, respectively. The link cross frame 461 is arranged so as to extend rectilinearly along the vehicle width direction between the left and right second longitudinally extending frames 456L and 456R. The center bracket 462 extends along a rearward and downward oblique direction from a central portion of the link cross frame 461, and its tip portion is attached to a bracket 12a (which is provided at a front surface of the head pipe 12) by a bolt 464 and a nut 465.

The key cylinder holding part 438 for holding the key cylinder 407 is attached to a rear upper portion of the second longitudinally extending frame 456L on the left side. More specifically, the key cylinder holding part 438 is disposed at a position where the first longitudinally extending frame 453L and the second longitudinally extending frame 456L overlap each other in plan view shown in FIG. 18. In addition, the key cylinder holding part 438 is disposed at the same position as an upper portion of the head pipe 12 in the longitudinal vehicle direction. Further, the key cylinder holding part 438 overlaps the top bridge 30 and the handle holder 426 (which constitute the steering system 29) in side view shown in FIG. 19. The left-side lid lock mechanism 406L is disposed in a forward and downward oblique direction of the key cylinder 407 in side view.

An upper surface of the upper wall 438a of the key cylinder holding part 438 is oriented toward a vehicle width directionally inward and upward oblique direction. Therefore, the key insertion hole 407a of the key cylinder 407 is also oriented in the vehicle width directionally inward and upward oblique direction. Therefore, it is possible, for example, for the driver having got off the vehicle and standing on the left side of the vehicle body to insert the key into the key insertion hole 407a. It is also possible, for example, for the driver to turn the key by one hand so as to cancel the locking with the seat lock mechanism 437 (see FIG. 6) and to lift up the main seat 45 (see FIG. 4) by the other hand.

Figure 20A:
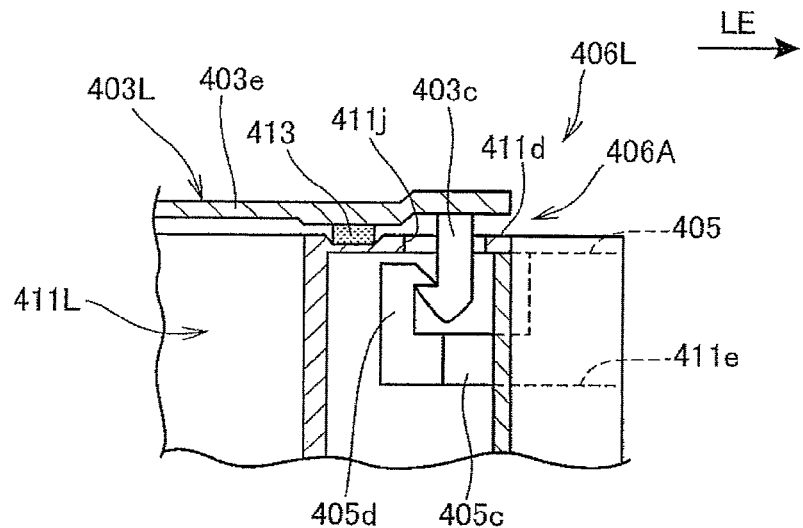
Figure 20B:
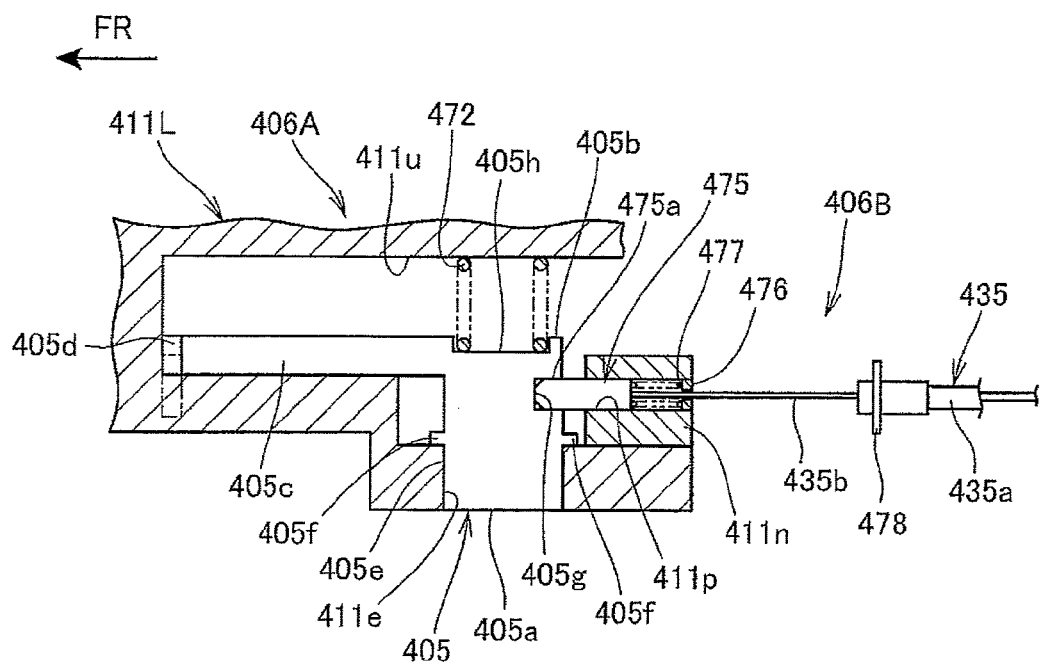

FIGS. 20(A) and 20(B) illustrate the lid lock mechanism 406L, wherein FIG. 20(A) is a sectional view of the lid lock mechanism 406L as viewed from the front side, and FIG. 20(B) is a sectional view of the lid lock mechanism 406L as viewed from above.

As shown in FIG. 20(A), the lid 403L is composed of an inner plate 403e provided with a hook-shaped lid engagement portion 403c at a lower surface thereof and an outer plate (not shown) attached to the inner plate 403e so as to be exposed to the exterior.

The lid lock mechanism 406L includes a lock mechanism 406A which locks the lid 403L in a closed state and unlocks the lid 403L from the closed state and an unlocking inhibition mechanism 406B (see FIG. 20(B)) which inhibits or permits the unlocking of the lid 403L with the lock mechanism 406A.

The lock mechanism 406A includes an operator insertion hole 411e, the lid operator 405, an operator extension portion 405c, and a hook portion 405d.

The operator extension portion 405c is a portion which is formed integrally with the lid operator 405 and is integrally formed at a tip portion thereof with the hook portion 405d for engagement with the lid engagement portion 403c of the lid 403L. Note that symbol 411j denotes an opening portion which is formed in the opening periphery portion 411d of the storage part main body 411L and into which the lid engagement portion 403c is inserted.

As shown in FIG. 20(B), the lid operator 405 includes an outer end face 405a pushed by a finger; an inner end face 405b on a depth side opposite to the side of the outer end face 405a and an operator projection 405f and an operator recess 405g which are formed at a side surface 405e between the outer end face 405a and the inner end face 405b.

The inner end face 405b is formed with an end recess 405h, and a compression coil spring 472 constituting a part of the lock mechanism 406A is disposed between the end recess 405h and an inner surface 411u of the storage part main body 411L. The operator projection 405f is a portion which prevents the lid operator 405 from coming off the operator insertion hole 411e and is pressed against the inside of the storage part main body 411L by the compression coil spring 472. The operator recess 405g is a portion for engagement with a part of the unlocking inhibition mechanism 406B which will be described in detail later.

The operator extension portion 405c is a portion which extends integrally and rectilinearly forward from an inner end portion side of the lid operator 405, and the hook portion 405d is integrally formed at a front end portion of the operator extension portion 405c.

The unlocking inhibition mechanism 406B includes a projecting wall 411n, a pin insertion hole 411p, an unlocking inhibition pin 475, a ring member 476, a compression coil spring 477, and the operator recess 405g of the lid operator 405.

The pin insertion hole 411p is bored along the longitudinal vehicle direction in the projecting wall 411n provided on the storage part main body 411L. The ring member 476 is fixed to a rear end portion of the pin insertion hole 411p. The unlocking inhibition pin 475 is movably inserted in the pin insertion hole 411p. More specifically, the unlocking inhibition pin 475 is inserted while being biased into the operator recess 405g of the lid operator 405 by the compression coil spring 477 provided between the unlocking inhibition pin 475 and the ring member 476. The inner wire 435b of the first cable 435 is connected to a rear end of the unlocking inhibition pin 475. A cable end support portion 478 is provided on the front sub-frame 433 (see FIG. 19) and on which the outer cable 435a of the first cable 435 is supported.

The above-mentioned configuration of the unlocking inhibition mechanism 406B ensures that in the state as shown in FIG. 20(B), the unlocking inhibition pin 475 is inserted in the operator recess 405g of the lid operator 405, so that the lid operator 405 cannot be operated and, therefore, the lid 403L cannot be opened.

Figure 21A:
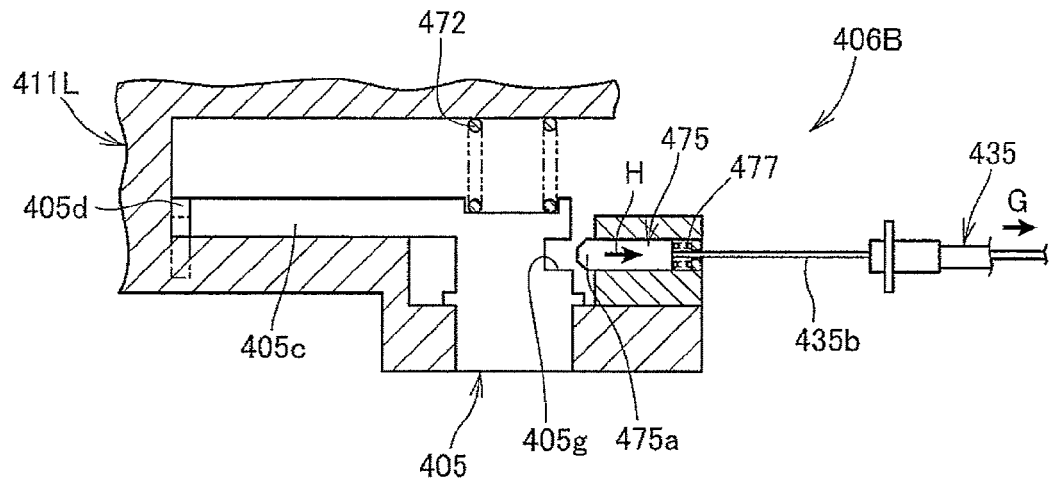
Figure 21B:
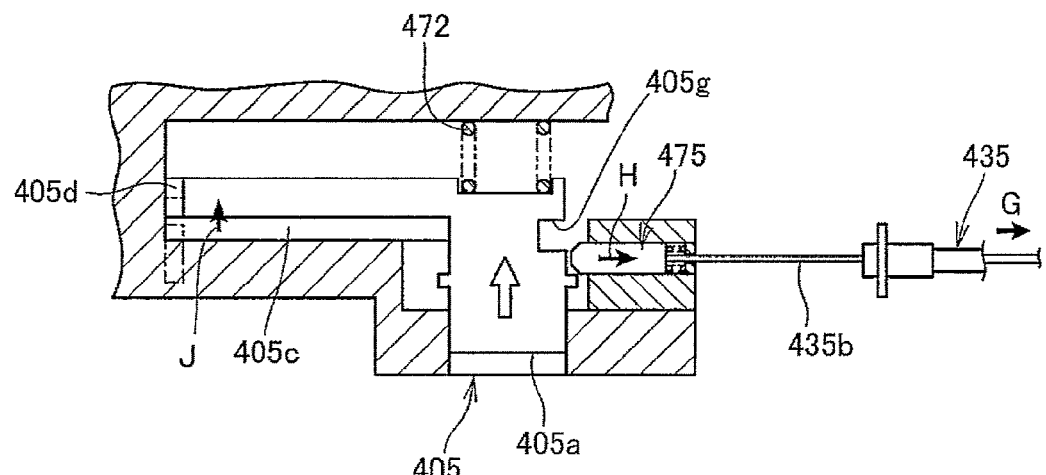
Figure 21C:
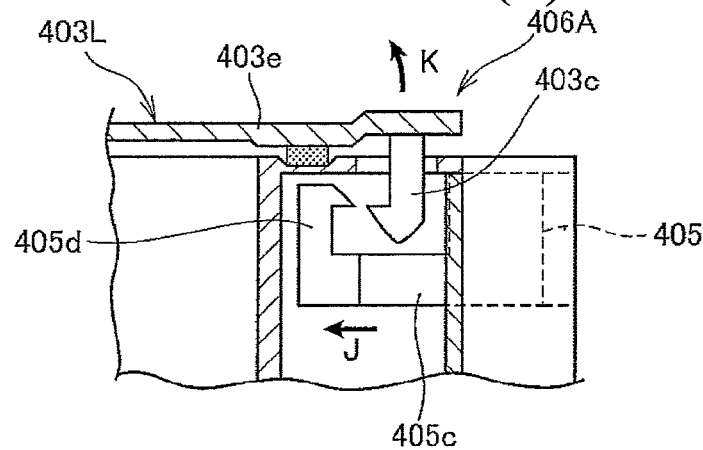

FIGS. 21(A) to 21(C)) show an operational view illustrating and operation of the lid lock mechanism 406L. FIG. 21(A) is an operational view showing a state in which the unlocking inhibition mechanism 406B is actuated, FIG. 21(B) is an operational view showing a state in which the lid operator 405 is operated, and FIG. 21(C) is an operational view showing an operation of the lock mechanism 406A.

As shown in FIG. 21(A), the key is inserted into the key cylinder 407 (see FIG. 17) and rotated clockwise. As a result, the inner wire 435b of the first cable 435 connected to the key cylinder 407 is pulled as indicated by arrow G. Attendant on this, the unlocking inhibition pin 475 is retracted as indicated by arrow H against an elastic force of the compression coil spring 477, and a tip portion 475a of the unlocking inhibition pin 475 is dislodged from the operator recess 405g formed in the lid operator 405.

Next, as shown in FIG. 21(B), the outer end face 405a of the lid operator 405 is pushed to move the lid operator 405 inward in the vehicle width direction against an elastic force of the compression coil spring 472, as indicated by an outline arrow. This results in that the operator extension portion 405c and the hook portion 405d are moved inward in the vehicle width direction together with the lid operator 405, as indicated by arrow J.

Consequently, as shown in FIG. 21(C), with the hook portion 405d moved inward in the vehicle width direction, the hook portion 405d is disengaged from the lid engagement portion 403c of the lid 403L, and the lid engagement portion 403c is moved as indicated by arrow K by an elastic force of the torsion coil spring 424 (see FIG. 11) provided on the hinge 412 (see FIG. 11). That is, the lid 403L is opened.

If the operation on the key cylinder side is not conducted, namely, if the inner wire 435b of the first cable 435 is not pulled, in FIG. 21(A), the state as shown in FIG. 20(A) is maintained, and the lid operator 405 cannot be pushed, so that the lid 403L cannot be opened.

As shown in FIGS. 1, 6, 8, 13 and 19, the body frame F of the motorcycle 1 as the saddle type vehicle includes the head pipe 12, the main frames 13L and 13R provided rearwardly of the head pipe 12, and the seat frames 15L and 15R as seat rails connected to the rear ends of the main frames 13L and 13R, with the main seat 45 (as the seat) being detachably supported on the seat frames 15L and 15R. The locking structure for the motorcycle 1 includes the front cover 47 covering the head pipe 12 from the front side. The front cover 47 includes the outer cover 56a whose face is oriented outward in the vehicle width direction, and the inner cover 56b whose face is oriented inward in the vehicle width direction. The outer cover 56a and the inner cover 56b are provided as one body or as separate bodies. The front cover 47 is provided with the storage parts 401L and 401R openably closed with the lids 403L and 403R. The lids 403L and 403R can be locked in a closed state or unlocked from the closed state by the lid lock mechanisms 406L and 406R. The seat is the main seat 45 on which to seat the driver. The main seat 45 can be locked in engagement with the seat frames 15L and 15R or unlocked from the engaged state by the seat lock mechanism 437. At least one of the lid lock mechanism 406L and the seat lock mechanism 437 is connected to the key cylinder 407 by the cable (the first cable 435, the second cable 436). In addition, the key cylinder 407 overlaps the steering shaft 425 in side view, and is located within the opening 56f, which is provided in the inner cover 56b, in top plan view.

This configuration, in which the storage parts 401L and 401R are provided inside the front cover 47, ensures that storage space can be secured in the vehicle body. In addition, since one side surface of the key cylinder 407 connected to at least one of the lid lock mechanism 406L and the seat lock mechanism 437 is covered with the steering shaft 425 and the key cylinder 407 is located inside the inner cover 56b, a tamper-proofing effect on the key cylinder 407 can be enhanced. Furthermore, since the single key cylinder 407 is provided for a plurality of lock mechanisms, namely, the lid lock mechanism 406L and the seat lock mechanism 437, it is possible to reduce the space taken up by the vehicle body, while preventing a rise in cost. Thus, the key cylinder 407 can be easily disposed even in a small vehicle body space of the motorcycle 1.

As shown in FIGS. 6, 7, 18 and 19, the main frames 13L and 13R are provided in a left-right pair with the fuel tank 41 being disposed between the left and right main frames 13L and 13R. The lid lock mechanism 406L is disposed forwardly of the fuel tank 41 with the seat lock mechanism 437 being disposed rearwardly of the fuel tank 41. The key cylinder 407 is located between the lid lock mechanism 406L and the seat lock mechanism 437 in a side view and is supported by the front sub-frame 433 (which is extended in a forward direction from a front portion of the body frame F and supports the front cover 47) at a position with an offset along the vehicle width direction from the center of the vehicle body. Therefore, since the key cylinder 407 designed to specialize in locking of the main seat 45 and the storage part 401L is disposed between the lid lock mechanism 406L and the seat lock mechanism 437, the first cable 435 and the second cable 436 for connecting them can be minimized in length. Further, since the attachment part for the key cylinder 407 is provided on the front sub-frame 433 located at a front portion of the vehicle body, the processing required in this instance can be facilitated as compared with the case of processing the body frame F. Thus, enhanced productivity can be secured.

As shown in FIG. 14, the outer cover 56a and the inner cover 56b are separate bodies with the inner cover 56b including the first inclined surface 56g inclined toward the vehicle width directionally inner side and the second inclined surface 56h inclined steeper than the first inclined surface 56g and roughly vertical. The opening 56f is provided in the first inclined surface 56g with the lateral side of the key cylinder 407 being covered with the second inclined surface 56h. With the opening 56f thus provided in the first inclined surface 56g, a structure is realized in which the opening 56f and the key insertion hole 407a are invisible sideways. Furthermore, with the key cylinder 407 covered from the lateral side by the second inclined surface 56h, tampering with the key cylinder 407 can be prevented more securely. Further, with the outer cover 56a and the inner cover 56b provided as separate bodies, the recess 56d and the opening 56f and the like can be provided easily. Consequently, enhanced productivity can be realized.

Further, as shown in FIGS. 6, 16 and 19, the front sub-frame 433 includes the key cylinder holding part 438 which holds the key cylinder 407. The key cylinder holding part 438 includes the front wall 438b as the front covering portion and the rear wall 438c as the rear covering portion, which cover the front and rear sides of the key cylinder 407. The first cable 435 and the second cable 436, connected respectively to the lid lock mechanism 406L and the seat lock mechanism 437, are supported by the rear wall 438c. With the front and rear sides of the key cylinder 407 thus covered with the key cylinder holding part 438. Therefore, tampering can be prevented further securely. Further, with the first cable 435 and the second cable 436 supported by the rear wall 438c, the number of component parts can be reduced as compared with the case where a cable holding part is specially provided.

As shown in FIGS. 7, 15 and 16, the decorative laminate 431 is provided between the key cylinder holding part 438 and the front cover 47 with the decorative laminate 431 being provided with the opening 431a through which the key insertion hole 407a as the key hole of the key cylinder 407 is exposed. The decorative laminate 431 is fastened at two positions, namely, at an upper portion and a side portion of the key cylinder holding part 438. This enables a highly accurate positioning of the key cylinder 407 and the decorative laminate 431. Accordingly, the key insertion hole 407a can be put into register with the opening 431a of the decorative laminate 431 accurately, whereby enhanced the external appearance. Thus, an enhanced quality can be ensured.

As shown in FIGS. 13 and 16, the decorative laminate 431 is visible via the opening 56f of the front cover 47 in a plan view. The decorative laminate 431 is provided, as one body, with the lower guide portion 431f and the upper guide portion 431j as the guide portions for respectively guiding the first cable 435 and the second cable 436 as well as with the inside portion 431b as the inside covering portion for covering the inner side in the vehicle width direction. Positional matching between the center of the opening 56f of the front cover 47 and the center of the key insertion hole 407a of the key cylinder 407 is difficult to achieve in a vehicle in which a plurality of covers are assembled together. In the present invention, on the other hand, the decorate laminate 431 is positionally matched to the key cylinder 407, and the large opening 56f of the front cover 47 is disposed thereon so that the opening 56f is visible together with the decorative laminate 431. This ensures that positional scattering of the opening 56f of the front cover 47 and the decorative laminate 431 is made inconspicuous. Thus, an enhanced external appearance can be achieved. Further, the lower guide portion 431f and the upper guide portion 431j as well as the inside portion 431b are provided as one body guiding for protecting the first cable 435 and the second cable 436.

The aforementioned embodiment merely shows one mode of carrying out the present invention, and arbitrary modifications and applications are possible within the scope and spirit of the present invention.

For instance, in the above embodiment, the inner covers 56b and 56j have been integrally formed inside the outer covers 56a as shown in FIG. 13. This structure, however, is not restrictive. The inner covers 56b and 56j may be provided inside the outer covers 56a as separate bodies.

In addition, as shown in FIG. 16, the decorative laminate 431 has been configured by use of the inside portion 431b, the upper belt-like portion 431c, the lower-side covering portion 431d, the downwardly extending portion 431e, and the lower guide portion 431f. This configuration, however, is not restrictive. The decorative laminate may be composed only of the inside portion 431b and the upper belt-like portion 431c. This makes it possible to simplify the decorative laminate in shape and to realize reductions in weight and cost.

As shown in FIG. 16, both the first cable 435 and the second cable 436 have been connected to the key cylinder 407. This structure, however, is not restrictive. A structure may be adopted in which only one of the first cable 435 and the second cable 436 is connected to the key cylinder 407.

As shown in FIG. 17, only the lid lock mechanism 406L on the left side has been linked to the key cylinder 407 through the first cable 435. This structure, however, is not restrictive. A structure may be adopted in which the lid lock mechanism 406R on the right side (see FIG. 8) is also linked to the key cylinder 407 through a cable. In this case, it is ensured that when either of the left and right lid operators 405 in FIGS. 8 and 17 is operated while turning the key inserted in the key cylinder 407, either of the left and right lids 403L and 403R is opened.

The present invention is not limited to application to the motorcycle 1. The present invention is applicable also to other saddle type vehicles than motorcycles. Note that the saddle type vehicles generally include those vehicles on which the rider(s) is seated astride a vehicle body, and refer to vehicles including not only motorcycles (inclusive of motorbikes) but also three-wheeled vehicles and four-wheeled vehicles classified as ATV (all terrain vehicles).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A locking structure for a saddle vehicle including a body frame, the body frame including a head pipe, main frames provided rearwardly of the head pipe, and seat rails connected to rear ends of the main frames, with a seat being detachably supported on the seat rails, the structure comprising:

a front cover covering the head pipe from a front side;
wherein the front cover includes a front outer cover having a face oriented outwardly in a vehicle width direction, and a front inner cover having a face oriented inwardly in the vehicle width direction, the front outer cover and the front inner cover being provided as one body or as separate bodies;

the front cover is provided with a storage part openably closed with a lid, the lid being lockable in a closed state or unlockable from the closed state by a lid lock mechanism;

the seat is a main seat on which to seat a driver, the seat being lockable in an engaged state with the seat rail or unlockable from the engaged state by a seat lock mechanism;

at least one of the lid lock mechanism and the seat lock mechanism is connected to a key cylinder by a cable; and the key cylinder overlaps a steering shaft in a side view and is located within an opening, which is provided in the front inner cover, in a top plan view.

2. The locking structure for the saddle vehicle according to claim 1, wherein the main frames are provided in a left-right pair, a fuel tank is disposed between the left and right main frames, the lid lock mechanism is disposed forwardly of the fuel tank, and the seat lock mechanism is disposed rearwardly of the fuel tank;

the key cylinder is disposed between the lid lock mechanism and the seat lock mechanism in the side view and is supported, at a position with an offset in the vehicle width direction from a vehicle body center, by a front sub-frame extending in a forward direction from a front portion of the body frame to support the front cover.

3. The locking structure for the saddle vehicle according to claim 1, wherein the front outer cover and the front inner cover are provided as separate bodies;

the front inner cover has a first inclined surface inclined toward an inner side in the vehicle width direction and a substantially vertical second inclined surface steeper in inclination than the first inclined surface;

the opening is provided in the first inclined surface; and a lateral side of the key cylinder is covered with the second inclined surface.

4. The locking structure for the saddle vehicle according to claim 2, wherein the front outer cover and the front inner cover are provided as separate bodies;

the front inner cover has a first inclined surface inclined toward an inner side in the vehicle width direction and a substantially vertical second inclined surface steeper in inclination than the first inclined surface;

the opening is provided in the first inclined surface; and a lateral side of the key cylinder is covered with the second inclined surface.

5. The locking structure for the saddle vehicle according to claim 1, wherein the front sub-frame includes a key cylinder holding part holding the key cylinder, the key cylinder holding part including a front covering portion and a rear covering portion which respectively cover a front side and a rear side of the key cylinder, and the cables connected, respectively, to the lid lock mechanism and the seat lock mechanism are supported by the rear covering portion.

6. The locking structure for the saddle vehicle according to claim 2, wherein the front sub-frame includes a key cylinder holding part holding the key cylinder, the key cylinder holding part including a front covering portion and a rear covering portion which respectively cover a front side and a rear side of the key cylinder, and the cables connected, respectively, to the lid lock mechanism and the seat lock mechanism are supported by the rear covering portion.

7. The locking structure for the saddle vehicle according to claim 3, wherein the front sub-frame includes a key cylinder holding part holding the key cylinder, the key cylinder holding part including a front covering portion and a rear covering portion which respectively cover a front side and a rear side of the key cylinder, and the cables connected, respectively, to the lid lock mechanism and the seat lock mechanism are supported by the rear covering portion.

8. The locking structure for the saddle vehicle according to claim 4, wherein the front sub-frame includes a key cylinder holding part holding the key cylinder, the key cylinder holding part including a front covering portion and a rear covering portion which respectively cover a front side and a rear side of the key cylinder, and the cables connected, respectively, to the lid lock mechanism and the seat lock mechanism are supported by the rear covering portion.

9. The locking structure for the saddle vehicle according to claim 5, wherein a decorative laminate is provided between the key cylinder holding part and the front cover;

the decorative laminate is provided with an opening through which a key hole of the key cylinder is exposed; and the decorative laminate is fastened to two portions, consisting of an upper portion and a side portion, of the key cylinder holding part.

10. The locking structure for the saddle vehicle according to claim 9, wherein the decorative laminate is visible through the opening of the front cover in a plan view, and is provided, as one body, with guide portions for guiding the cables and an inside covering portion for covering an inner side in the vehicle width direction.

11. A locking structure for a saddle vehicle including a body frame, the body frame including a head pipe, main frames provided rearwardly of the head pipe, and seat rails connected to rear ends of the main frames the structure comprising:

a front cover covering the head pipe from a front side, said front cover including a front outer cover having a face oriented outwardly in a vehicle width direction, and a front inner cover having a face oriented inwardly in the vehicle width direction, the front outer cover and the front inner cover being provided as one body or as separate bodies;

a storage part formed in the front cover;

a lid operatively secured to said storage part for opening and closing the lid relative to the storage part;

a lid lock mechanism operatively connected to said lid, said lid lock mechanism being lockable in a closed state of the lid or unlockable from the closed state to an open state of the lid;

a seat detachably supported on the seat rails;

a seat lock mechanism operatively connected to said seat, said seat lock mechanism being lockable in an engaged state with the seat rail or unlockable from the engaged state with the seat rail;

at least one of the lid lock mechanism and the seat lock mechanism is connected to a key cylinder by a cable; and the key cylinder overlaps a steering shaft in a side view and is located within an opening, which is provided in the front inner cover, in a top plan view.

12. The locking structure for the saddle vehicle according to claim 11,
    wherein the main frames are provided in a left-right pair, a fuel tank is disposed between the left and right main frames, the lid lock mechanism is disposed forwardly of the fuel tank, and the seat lock mechanism is disposed rearwardly of the fuel tank;
    the key cylinder is disposed between the lid lock mechanism and the seat lock mechanism in the side view and is supported, at a position with an offset in the vehicle width direction from a vehicle body center, by a front sub-frame extending in a forward direction from a front portion of the body frame to support the front cover.

13. The locking structure for the saddle vehicle according to claim 11,
    wherein the front outer cover and the front inner cover are provided as separate bodies;
    the front inner cover has a first inclined surface inclined toward an inner side in the vehicle width direction and a substantially vertical second inclined surface steeper in inclination than the first inclined surface;
    the opening is provided in the first inclined surface; and
    a lateral side of the key cylinder is covered with the second inclined surface.

14. The locking structure for the saddle vehicle according to claim 12,
    wherein the front outer cover and the front inner cover are provided as separate bodies;
    the front inner cover has a first inclined surface inclined toward an inner side in the vehicle width direction and a substantially vertical second inclined surface steeper in inclination than the first inclined surface;
    the opening is provided in the first inclined surface; and
    a lateral side of the key cylinder is covered with the second inclined surface.

15. The locking structure for the saddle vehicle according to claim 11,
    wherein the front sub-frame includes a key cylinder holding part holding the key cylinder, the key cylinder holding part including a front covering portion and a rear covering portion which respectively cover a front side and a rear side of the key cylinder, and
    the cables connected, respectively, to the lid lock mechanism and the seat lock mechanism are supported by the rear covering portion.

16. The locking structure for the saddle vehicle according to claim 12,
    wherein the front sub-frame includes a key cylinder holding part holding the key cylinder, the key cylinder holding part including a front covering portion and a rear covering portion which respectively cover a front side and a rear side of the key cylinder, and
    the cables connected, respectively, to the lid lock mechanism and the seat lock mechanism are supported by the rear covering portion.

17. The locking structure for the saddle vehicle according to claim 13,
    wherein the front sub-frame includes a key cylinder holding part holding the key cylinder, the key cylinder holding part including a front covering portion and a rear covering portion which respectively cover a front side and a rear side of the key cylinder, and
    the cables connected, respectively, to the lid lock mechanism and the seat lock mechanism are supported by the rear covering portion.

18. The locking structure for the saddle vehicle according to claim 14,
    wherein the front sub-frame includes a key cylinder holding part holding the key cylinder, the key cylinder holding part including a front covering portion and a rear covering portion which respectively cover a front side and a rear side of the key cylinder, and
    the cables connected, respectively, to the lid lock mechanism and the seat lock mechanism are supported by the rear covering portion.

19. The locking structure for the saddle vehicle according to claim 15,
    wherein a decorative laminate is provided between the key cylinder holding part and the front cover;
    the decorative laminate is provided with an opening through which a key hole of the key cylinder is exposed; and
    the decorative laminate is fastened to two portions, consisting of an upper portion and a side portion, of the key cylinder holding part.

20. The locking structure for the saddle vehicle according to claim 19,
    wherein the decorative laminate is visible through the opening of the front cover in a plan view, and is provided, as one body, with guide portions for guiding the cables and an inside covering portion for covering an inner side in the vehicle width direction.

* * * * *